United States Patent [19]
Hanaoka

[11] Patent Number: 5,583,858
[45] Date of Patent: Dec. 10, 1996

[54] ASYNCHRONOUS TRANSFER MODE SWITCHING DEVICE

[75] Inventor: Hidetoshi Hanaoka, Kawasaki, Japan

[73] Assignee: Fujitsu Limited, Kawasaki, Japan

[21] Appl. No.: 313,894

[22] Filed: Sep. 28, 1994

[30] Foreign Application Priority Data

Sep. 30, 1993 [JP] Japan ..................... 5-245244

[51] Int. Cl.$^6$ ................................. H04L 12/56
[52] U.S. Cl. .......................... 370/392; 370/395
[58] Field of Search .................. 370/58.1, 58.2, 370/58.3, 60, 60.1, 61, 94.1, 85.6, 82, 83, 79, 99, 110.1, 13, 17

[56] References Cited

U.S. PATENT DOCUMENTS

| | | | |
|---|---|---|---|
| 4,837,761 | 6/1989 | Isono | 370/60 |
| 4,993,018 | 2/1991 | Hajikano | 370/60 |
| 5,263,024 | 11/1993 | Kumaki et al. | 370/94.1 |
| 5,271,004 | 12/1993 | Proctor et al. | 370/94.1 |
| 5,274,641 | 12/1993 | Shobatake et al. | 370/60 |
| 5,280,483 | 1/1994 | Kamoi | 370/94.1 |
| 5,287,530 | 2/1994 | Davis et al. | 370/60 |

OTHER PUBLICATIONS

Spragius, "Telecommunications Protocols and Design", 1991, p. 324.

Primary Examiner—Wellington Chin
Assistant Examiner—Huy D. Vu
Attorney, Agent, or Firm—Armstrong, Westerman, Hattori, McLeland & Naughton

[57] ABSTRACT

An ATM switching device includes at least one ATM switch element, and a unit for appending a routing tag, which is composed of a single byte or a plurality of bytes and related to an incoming ATM cell, to the head of the ATM cell. The routing tag includes a control information having information concerning a priority level of the ATM cell and a discard level thereof, and includes a routing information defining a single address or a plurality of addresses. The ATM switch element effects a priority control for the ATM cell, and a discard control of an ATM cell or ATM cells depending on a storage quantity of a congestion control memory buffer, according to the control information, and effects a switching of the ATM cell according to an address value or address values defined in the routing information. By the constitution, it is possible to realize a speedy and simple switching of an ATM cell or ATM cells.

34 Claims, 43 Drawing Sheets

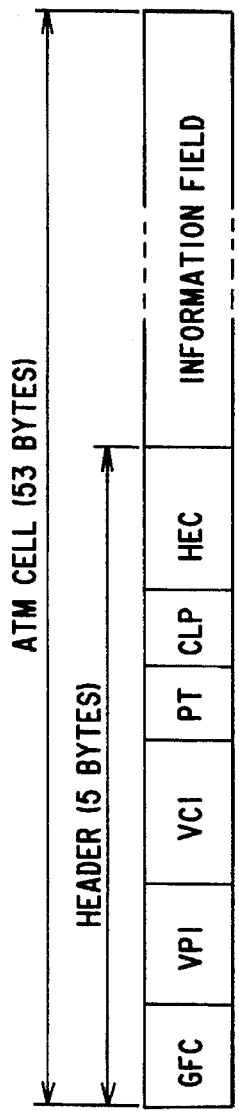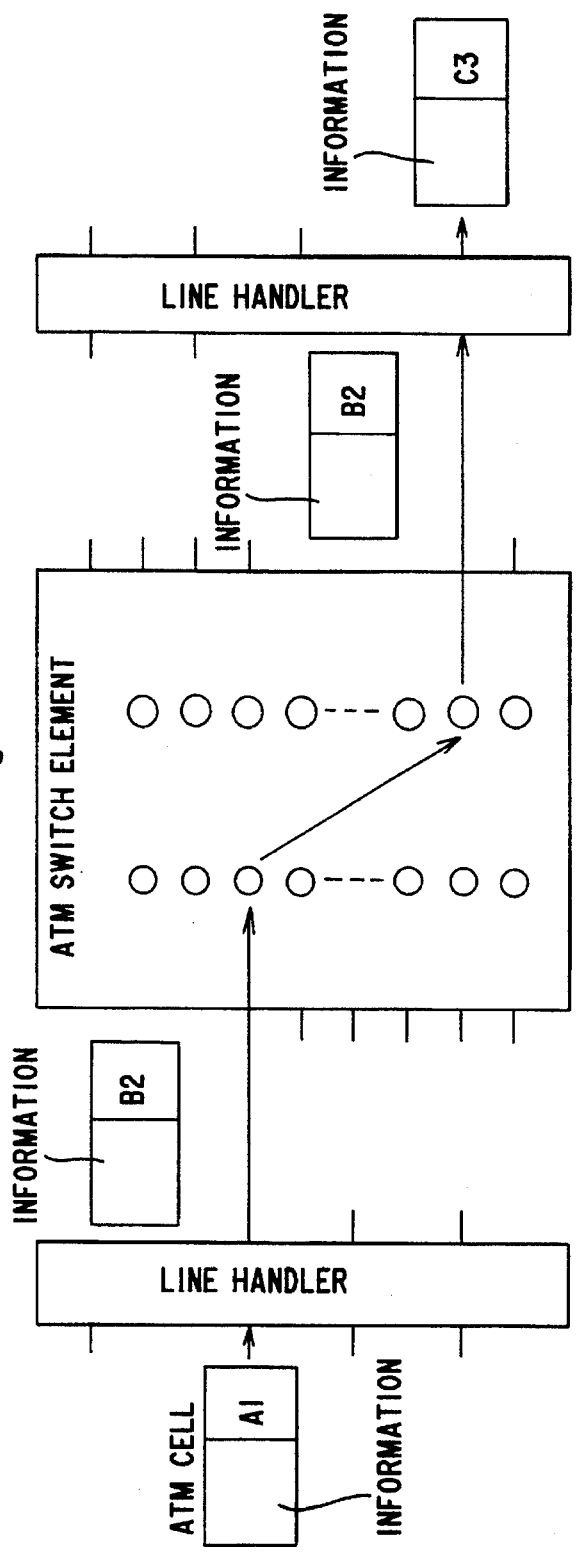

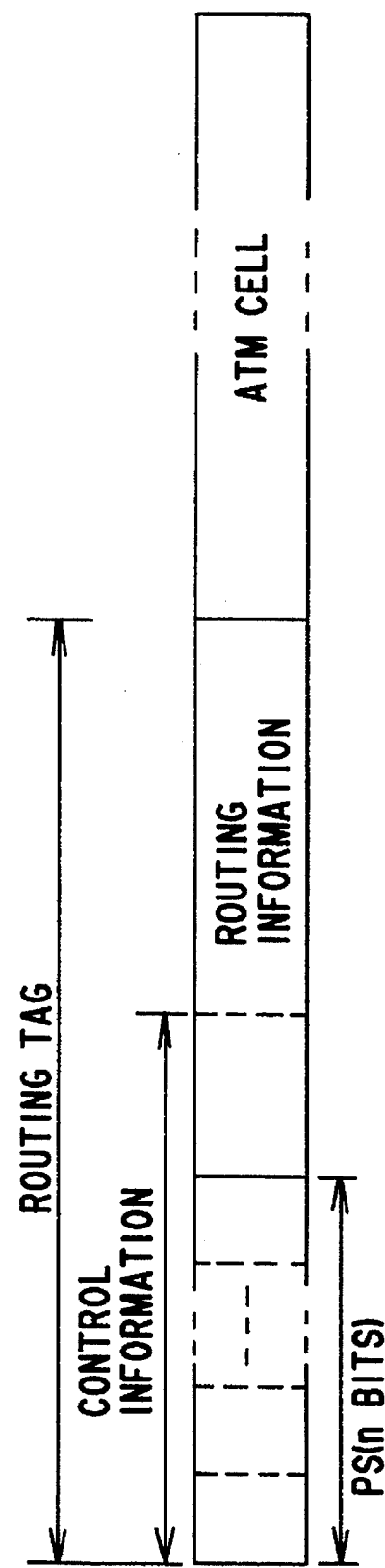

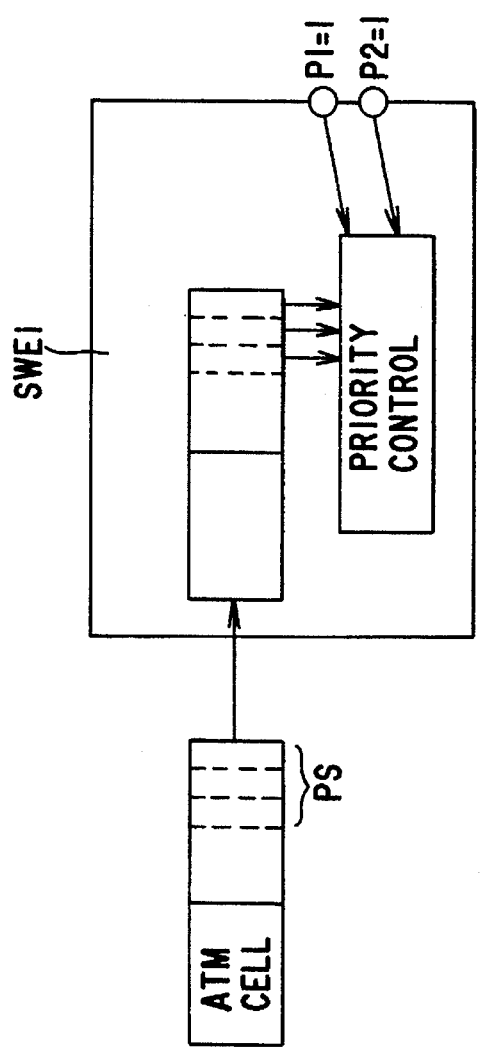

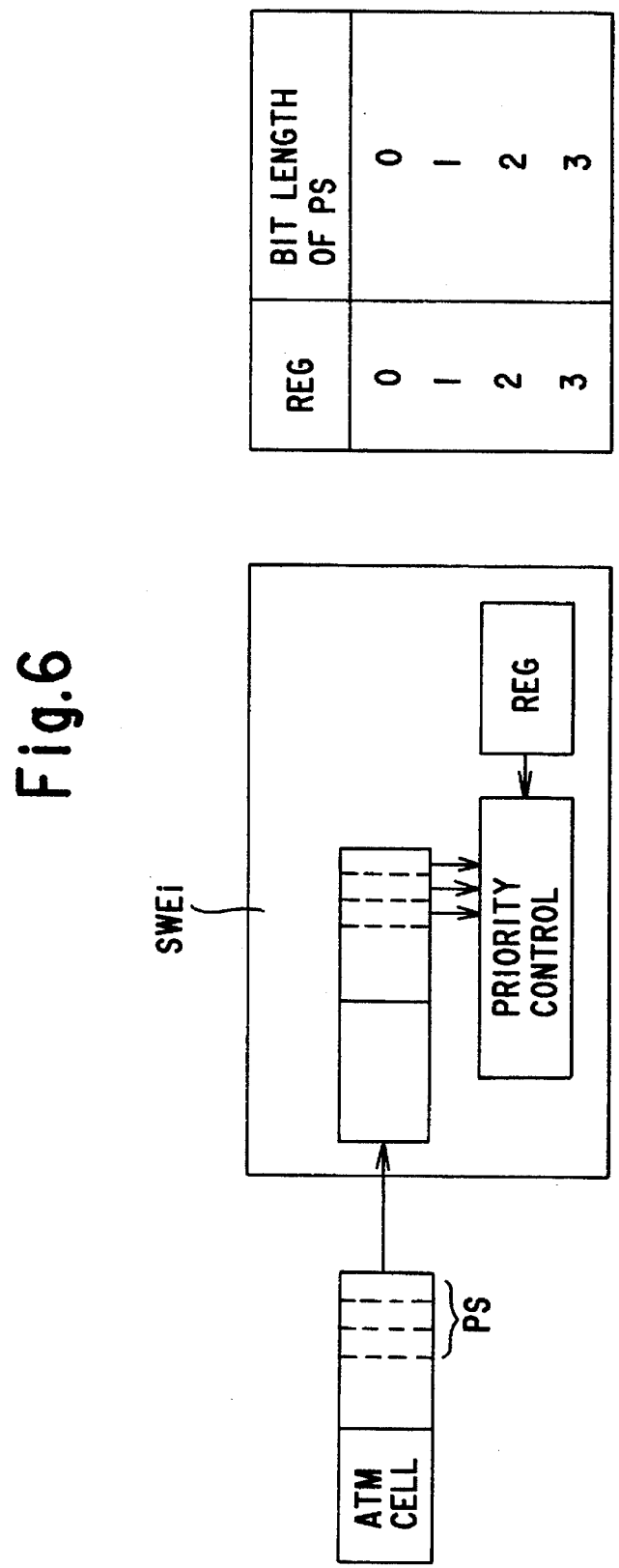

Fig.29b

| P1 | P2 | PRIORITY BIT LENGTH |
|----|----|---------------------|
| 0  | 0  | 1 BIT               |
| 0  | 1  | 2 BITS              |
| 1  | 0  | 3 BITS              |
| 1  | 1  | 4 BITS              |

Fig.29c

| A1 | A2 | ADDRESS POSITION |
|----|----|------------------|
| 0  | 0  | FIRST            |
| 0  | 1  | SECOND           |
| 1  | 0  | THIRD            |
| 1  | 1  | FOURTH           |

Fig.29d

| A1 | A2 | DISCARD BIT LENGTH |
|----|----|--------------------|
| 0  | 0  | 1 BIT              |
| 0  | 1  | 2 BITS             |
| 1  | 0  | 3 BITS             |
| 1  | 1  | 4 BITS             |

ASYNCHRONOUS TRANSFER MODE SWITCHING DEVICE

BACKGROUND OF THE INVENTION

1. Field of the Invention

The present invention relates an asynchronous transfer mode (ATM) switching device that is a fundamental art for a B-ISDN.

2. Description of the Related Art

In recent years, various information communications permitting low to high transmission rates have been developed. An ATM-related art has been regarded as a key to a success in reducing a load of an exchange that controls information transfer, and in integrating communication modes. In the field of the ATM-related art, an ATM switching device for switching ATM cells quickly and readily is attracting attention.

A conventional ATM switching device, for example, as shown in FIGS. 1a and 1b, requires an ATM switch element for switching an ATM cell, and line handlers for processing information necessary for switching an ATM cell based on header information (including six parameters GFC, VPI, VCI, PT, CLP, and HEC) of an incoming ATM cell, and for feeding the resultant information to the ATM switch element. Namely, when an ATM switch element switches an ATM cell, header information of the ATM cell must be used to switch the ATM cell.

In the above conventional device, however, where control information and address information constituting header information of an ATM cell are used as they are, a problem occurs in that control for switching an ATM cell becomes complicated since an amount of control information is insufficient and only a single address can be set. Also, a drawback arises in that respective loads to each ATM switch element get larger.

From the above, the performance of an entire ATM switching device largely depends upon respective performances of each ATM switch element which is normally constituted in the form of a one-chip device.

Also, even if an incoming ATM cell is an urgent ATM cell, e.g., an ATM cell containing information concerning human life, or the like, the ATM cell must be switched using ATM switch elements in the same manner as an ordinary (i.e., not urgent) ATM cell. Consequently, a problem occurs in that it is impossible to quickly switch an urgent ATM cell.

SUMMARY OF THE INVENTION

An object of the present invention is to provide an ATM switching device which can realize a speedy and simple switching of an ATM cell or ATM cells.

Another object of the present invention is to provide an ATM switching device by which where an incoming ATM cell is an urgent one, it is possible to quickly switch the urgent ATM cell alone without causing collision with other ATM cells, or without performing any priority control or congestion control, within respective ATM switch elements.

According to a first aspect of the present invention, there is provided an ATM switching device including: at least one ATM switch element; and means for appending a routing tag, which is composed of a single byte or a plurality of bytes and related to an incoming ATM cell, to the head of said ATM cell, said routing tag including a control information having information concerning a priority level of said ATM cell and a discard level thereof, and including a routing information defining a single address or a plurality of addresses, said ATM switch element effecting a priority control for said ATM cell, and a discard control of an ATM cell or ATM cells depending on a storage quantity of a congestion control memory buffer, according to said control information, and effecting a switching of said ATM cell according to an address value or address values defined in said routing information.

According to the above configuration, an ATM switch element switches an ATM cell according to a routing tag appended to the head of the ATM cell (control information and routing information concerning the ATM cell).

Therefore, the ATM cell can be switched readily, and thus the switching can be effected more quickly. Also, complex congestion control can be effected readily based on the control information of the routing tag.

Also, according to a second aspect of the present invention, there is provided an ATM switching device including: at least one ATM switch element; and means for appending an emergency identification bit indicating whether or not an incoming ATM cell is an urgent ATM cell, to the head of said ATM cell, when an ATM cell whose emergency identification bit represents a given logical value arrives at said ATM switch element, the ATM switch element holding all of ATM cells, other than ATM cells whose emergency identification bits represent said given logical values and which reside in the ATM switch element, in a congestion control memory buffer, so as to effect a switching of the urgent ATM cell as a top priority.

According to the above configuration, an urgent ATM cell is switched based on a logical value of the emergency identification bit. This obviates an occurrence of collision with other ATM cells, and makes priority control and congestion control unnecessary.

Thus, it is possible to quickly effect a switching of the urgent ATM cell.

BRIEF DESCRIPTION OF THE DRAWINGS

Other objects and features of the present invention will be described hereinafter in detail by way of preferred embodiments with reference to the accompanying drawings, in which:

FIGS. 1a and 1b are explanatory diagrams of a conventional ATM switching device;

FIG. 4 is an explanatory diagram of the principle of a second modified aspect of the aspect shown in FIGS. 2a and 2b;

FIG. 5 is an explanatory diagram of the principle of a third modified aspect of the aspect shown in FIGS. 2a and 2b;

FIG. 6 is an explanatory diagram of the principle of a fourth modified aspect of the aspect shown in FIGS. 2a and 2b;

FIGS. 29a to 29d are supplementary explanatory diagrams of FIG. 28;

DESCRIPTION OF THE PREFERRED EMBODIMENTS

Figure 2A:
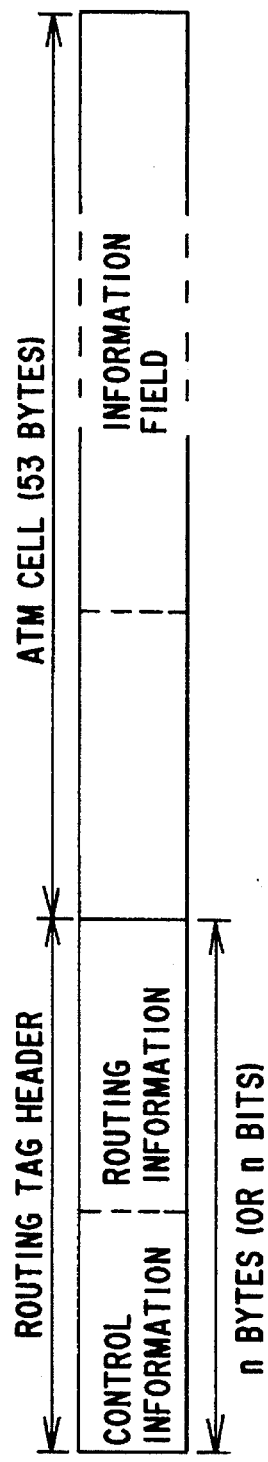
FIGS. 2a and 2b are explanatory diagrams of the principle of the ATM switching device according to a first aspect of the present invention.
Figure 2B:
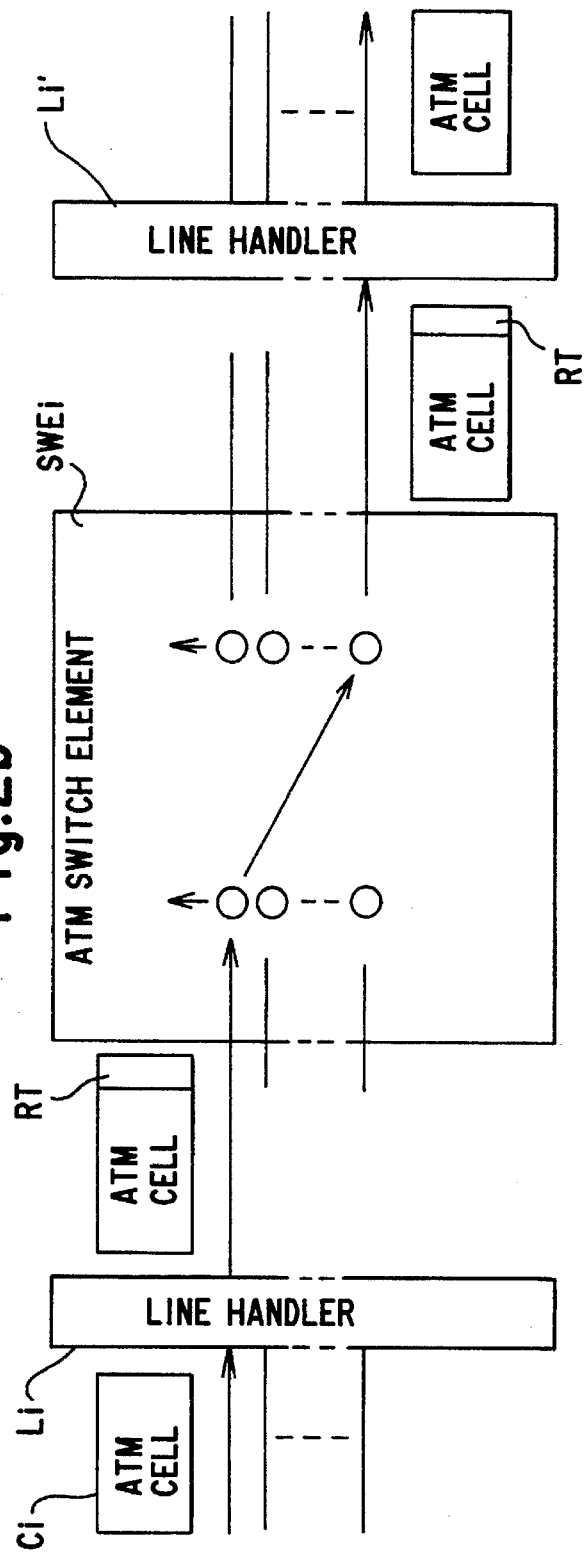

FIGS. 2a and 2b illustrate the ATM switching device according to the first aspect of the present invention.

As illustrated, the ATM switching device includes at least one ATM switch element SWEi, and means (line handler Li) for appending a routing tag RT, which is composed of n bytes or n bits and related to an incoming ATM cell Ci, to the head of the ATM cell. The routing tag RT includes a control information having information concerning a priority level of the ATM cell and a discard level thereof, and includes a routing information defining a single address or a plurality of addresses. The ATM switch element SWEi effects a priority control for the ATM cell, and a discard control of an ATM cell or ATM cells depending on a storage quantity of a congestion control memory buffer (not shown), according to the control information. The ATM switch element SWEi also effects a switching of the ATM cell according to an address value or address values defined in the routing information.

Figure 3A:
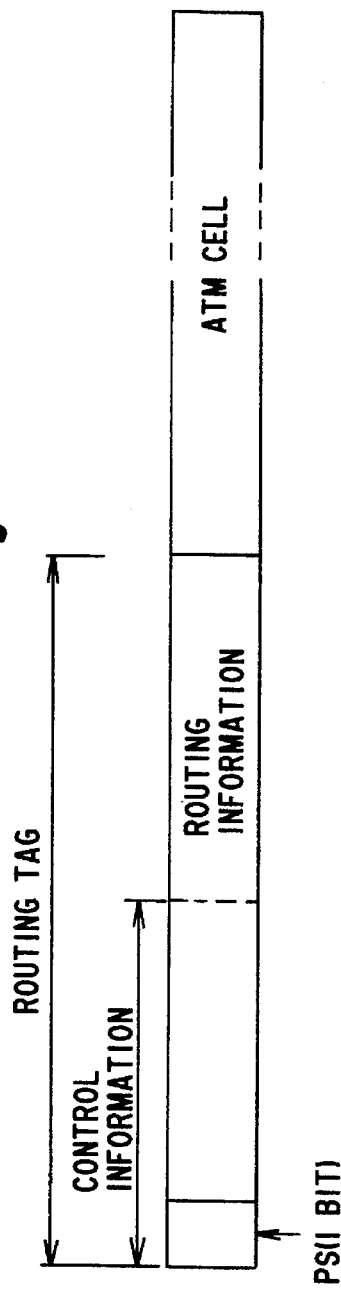
FIGS. 3a and 3b are explanatory diagrams of the principle of a first modified aspect of the aspect shown in FIGS. 2a and 2b.
Figure 3B:
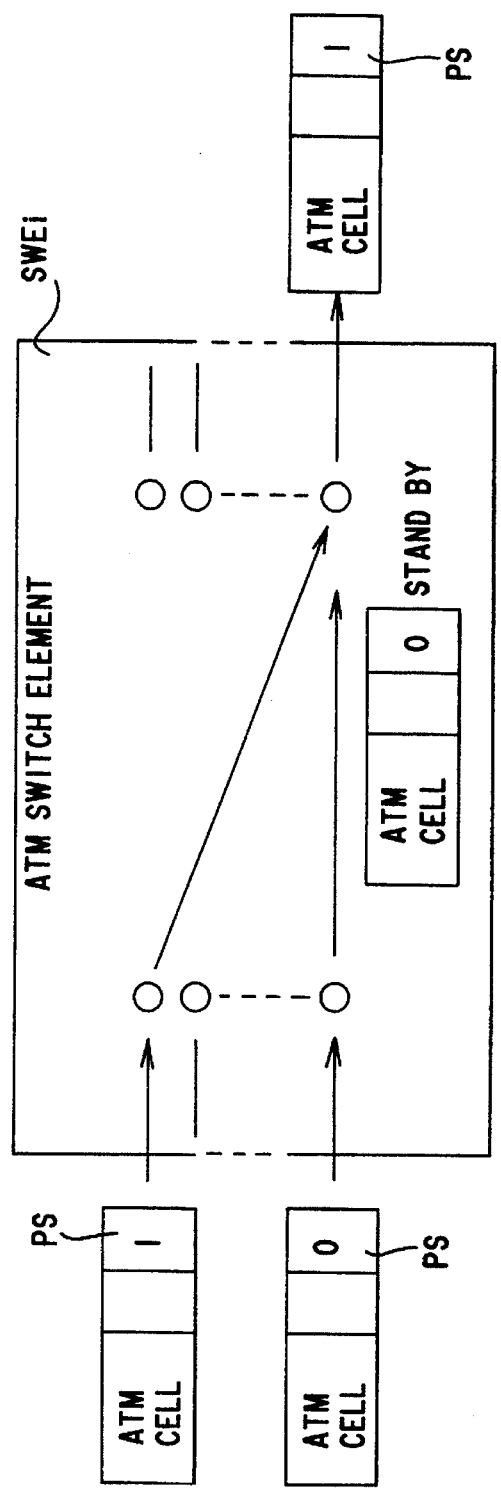

FIGS. 3a and 3b illustrate the first modified aspect of the aspect shown in FIGS. 2a and 2b.

FIG. 3a illustrates a format of a routing tag allowing one bit at the head of a routing tag to be padded with a priority setting bit PS. FIG. 3b illustrates the principle of operation based on the format shown in FIG. 3a. Namely, when two ATM cells each having a high priority level "1" and a low priority level "0", respectively, have arrived at an ATM switch element SWEi simultaneously and are to be sent to the same exit channel, the ATM cell having a low priority level stands by in a memory buffer and the ATM cell having a high priority level is sent out.

FIG. 4 illustrates the second modified aspect of the aspect shown in FIGS. 2a and 2b.

Namely, the illustration shows a format of a routing tag allowing a bit length of n bits from the head of the routing tag to be padded with a priority setting bit field PS. The principle of operation is the same as that of the aspect shown in FIGS. 3a and 3b.

FIG. 5 illustrates the third modified aspect of the aspect shown in FIGS. 2a and 2b.

As illustrated, the bit length of the priority setting bit field PS can be designated according to logical values set from terminals P1 and P2 of an ATM switching element SWEi.

FIG. 6 illustrates the fourth modified aspect of the aspect shown in FIGS. 2a and 2b.

As illustrated, the bit length of the priority setting bit field PS can be designated according to values stored in a control register REG in an ATM switching element SWEi.

Figure 7A:
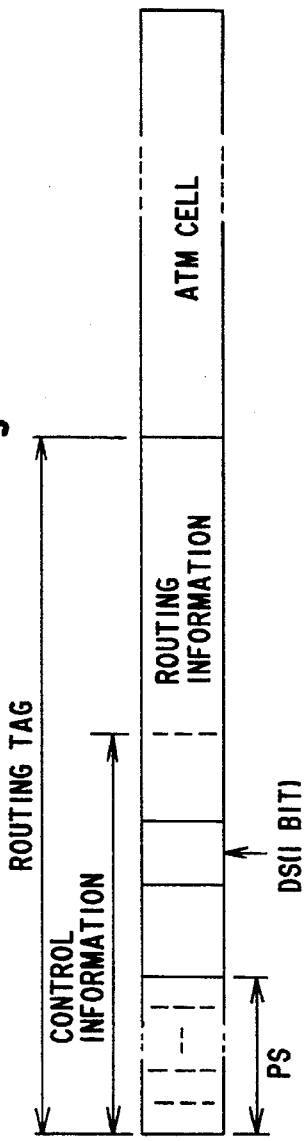
FIGS. 7a and 7b are explanatory diagrams of the principle of a fifth modified aspect of the aspect shown in FIGS. 2a and 2b.
Figure 7B:
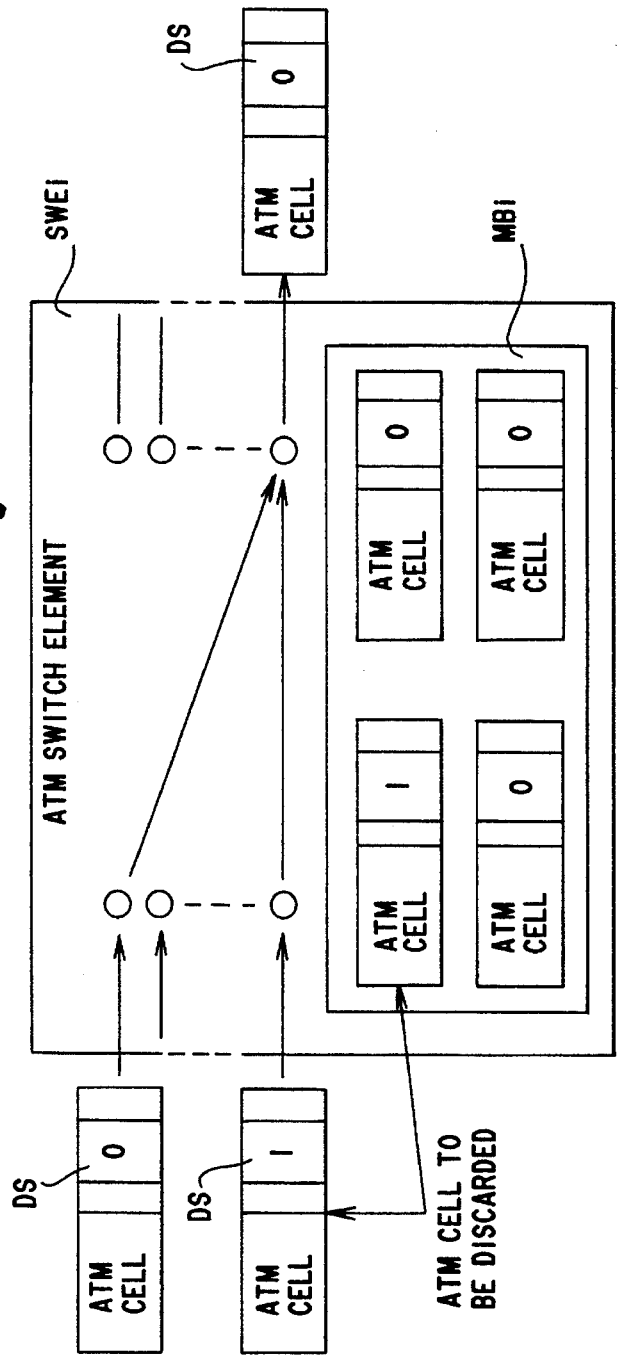

FIGS. 7a and 7b illustrate the fifth modified aspect of the aspect shown in FIGS. 2a and 2b.

FIG. 7a illustrates a format of a routing tag allowing control information in a routing tag to be padded with one discard level setting bit DS. FIG. 7b illustrates the principle of operation based on the format shown in FIG. 7a. Namely, when a memory buffer MBi in an ATM switch element SWEi is full and two new ATM cells arrive at the ATM switch element, ATM cells whose discard level setting bits DS are set to "1" are discarded.

Figure 8:
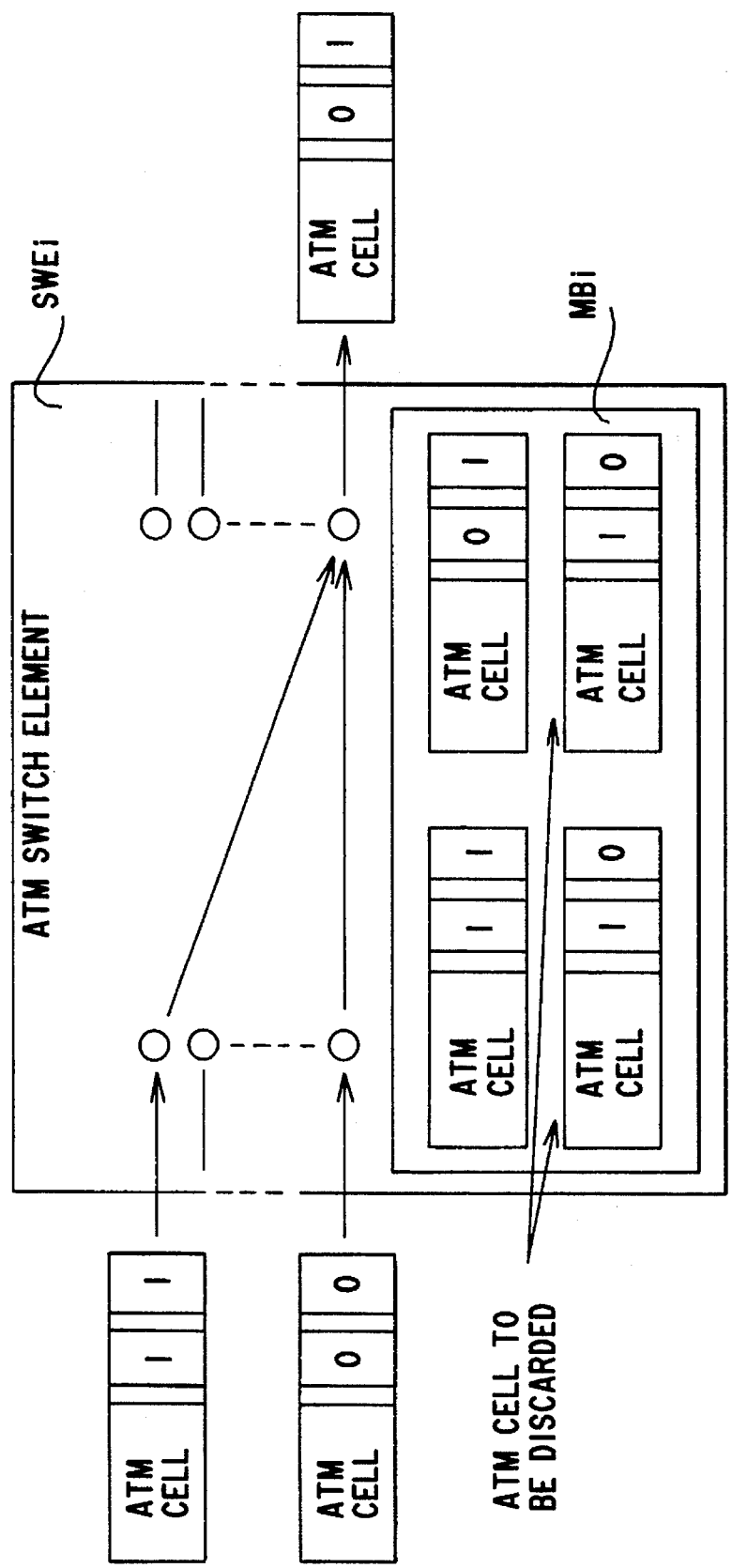
FIG. 8 is an explanatory diagram of the principle of a sixth modified aspect of the aspect shown in FIGS. 2a and 2b.

FIG. 8 illustrates the sixth modified aspect of the aspect shown in FIGS. 2a and 2b.

In FIG. 8, a discard cell is selected using one priority setting bit PS and one discard level setting bit DS. Namely, when a memory buffer MBi in an ATM switch element SWEi is full and two new ATM cells arrive at the ATM switch element, ATM cells whose discard level setting bits are set to "1" and whose priority levels are the lowest are discarded.

Figure 9:
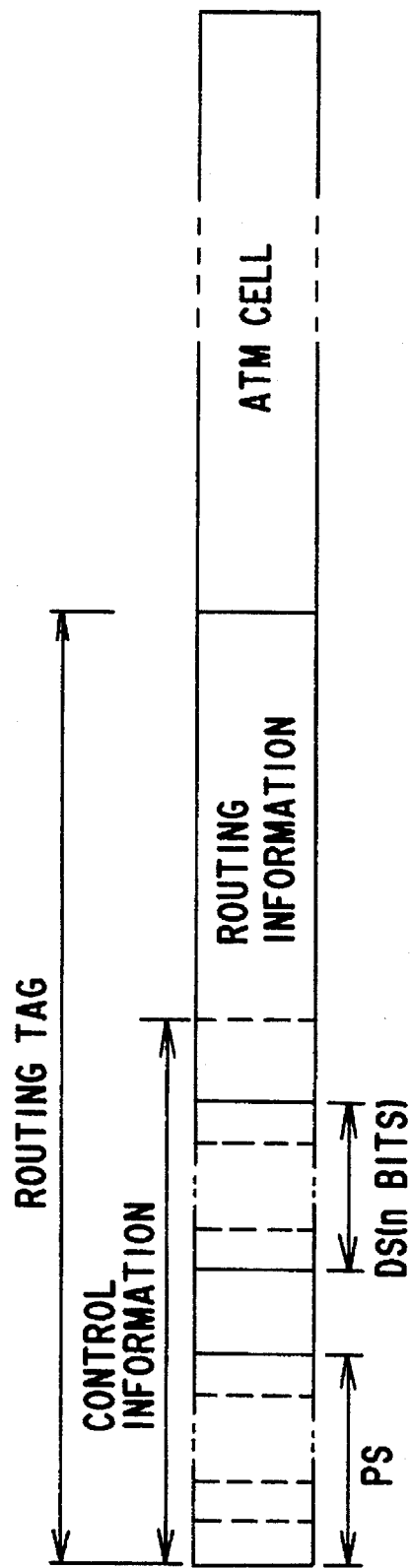
FIG. 9 is an explanatory diagram of the principle of a seventh modified aspect of the aspect shown in FIGS. 2a and 2b.

FIG. 9 illustrates the seventh modified aspect of the aspect shown in FIGS. 2a and 2b.

Namely, the illustration shows a format of a routing tag allowing control information in a routing tag to be padded with a discard level setting bit field DS composed of n bits. The principle of operation is the same as that of the aspect shown in FIGS. 7a and 7b, or of the aspect shown in FIG. 8.

Figure 10:
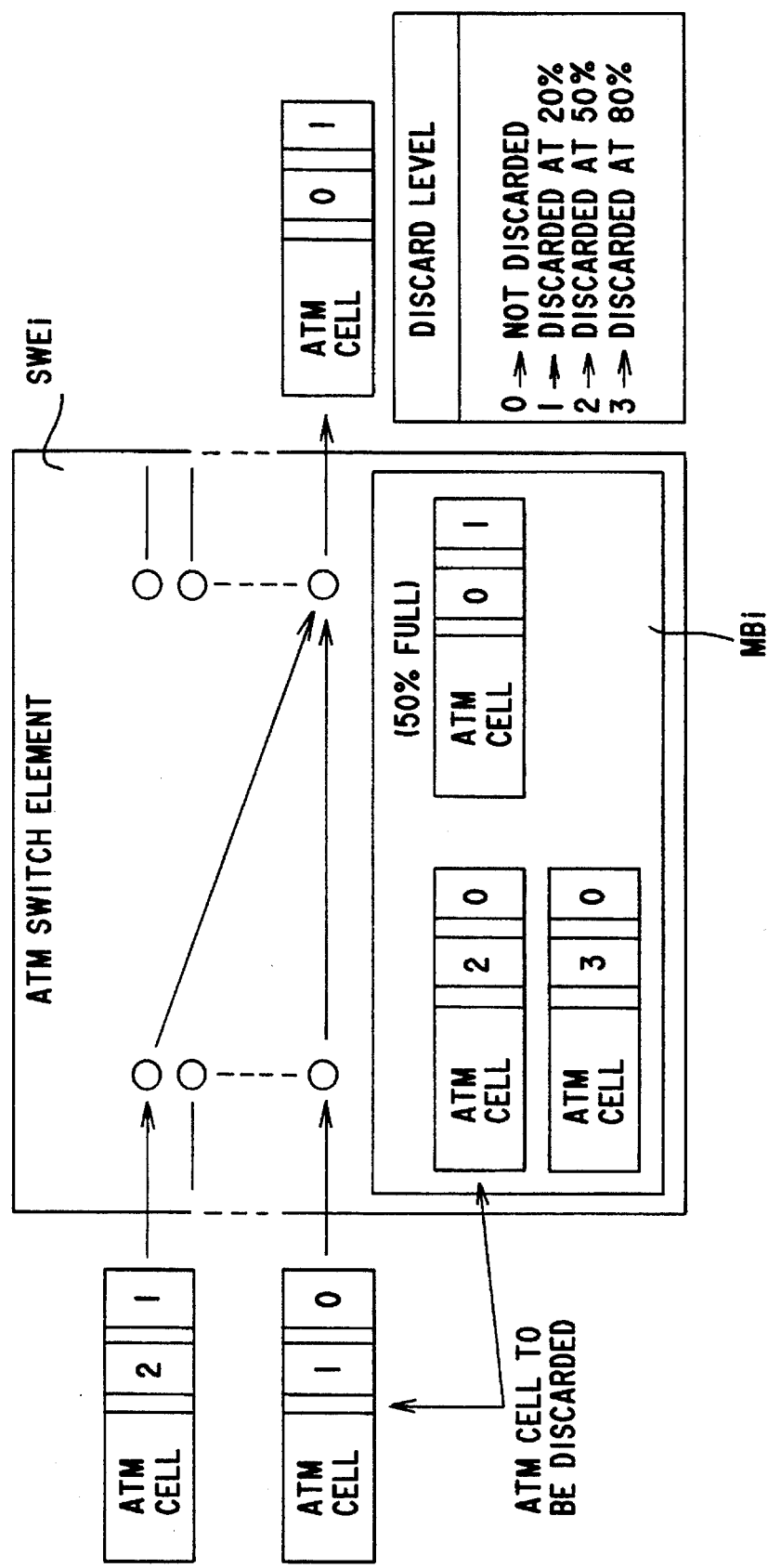
FIG. 10 is an explanatory diagram of the principle of an eighth modified aspect of the aspect shown in FIGS. 2a and 2b.

FIG. 10 illustrates the eighth modified aspect of the aspect shown in FIGS. 2a and 2b.

In FIG. 10, assuming that two new ATM cells arrive at an ATM switch element SWEi. If ATM cells, whose conditions signified by the discard level setting fields are satisfied, are present in a memory buffer and in the newly arrived ATM cells, ATM cells whose priority levels are the lowest are discarded.

Figure 11:
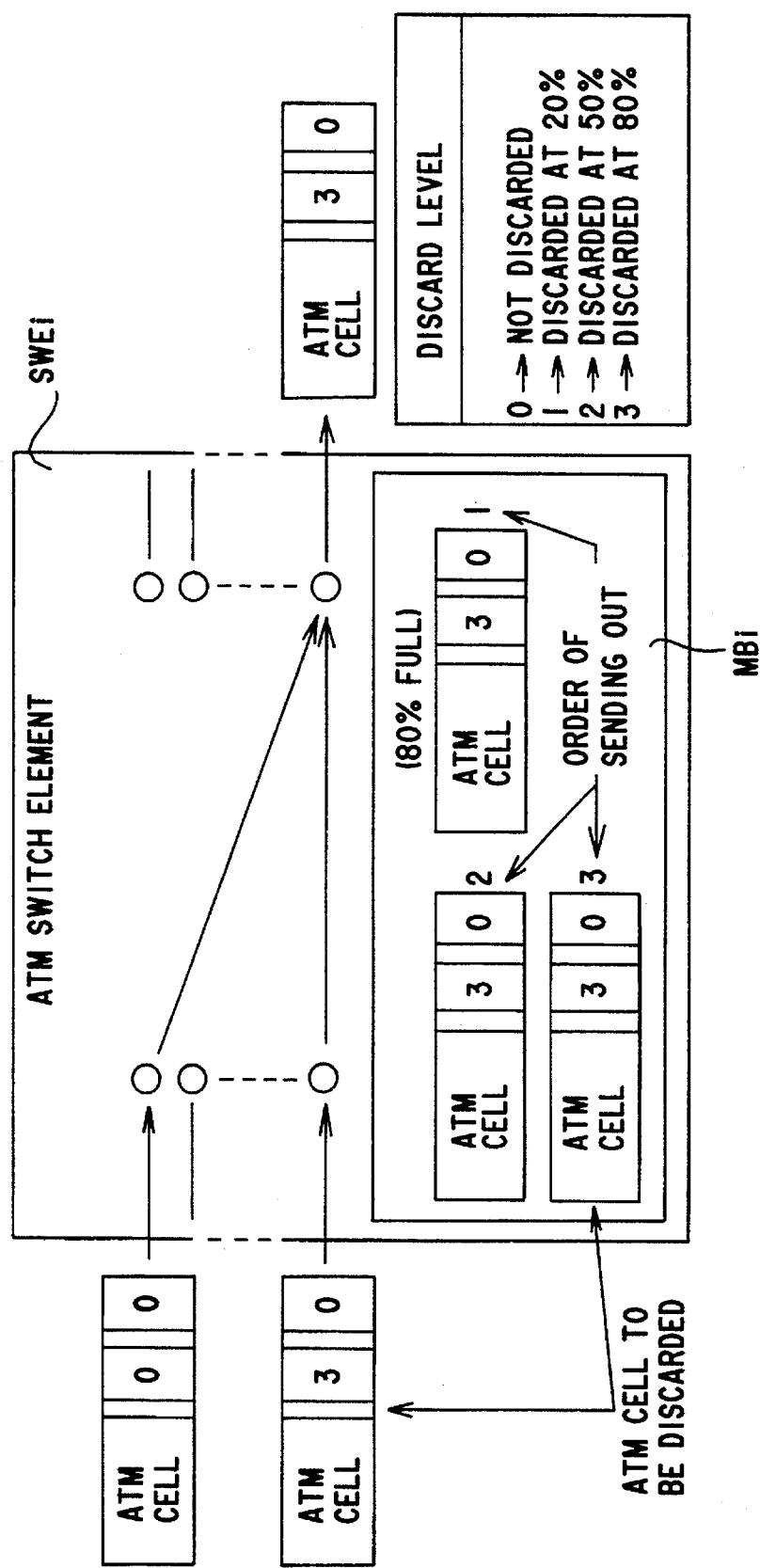
FIG. 11 is an explanatory diagram of the principle of a ninth modified aspect of the aspect shown in FIGS. 2a and 2b.

FIG. 11 illustrates the ninth modified aspect of the aspect shown in FIGS. 2a and 2b.

In FIG. 11, assuming that two new ATM cells arrive at an ATM switch element SWEi. If there are a plurality of ATM cells whose conditions signified by the discard level setting fields are satisfied, ATM cells are discarded in such an order that an ATM cell to be sent out last is discarded first.

Figure 12:
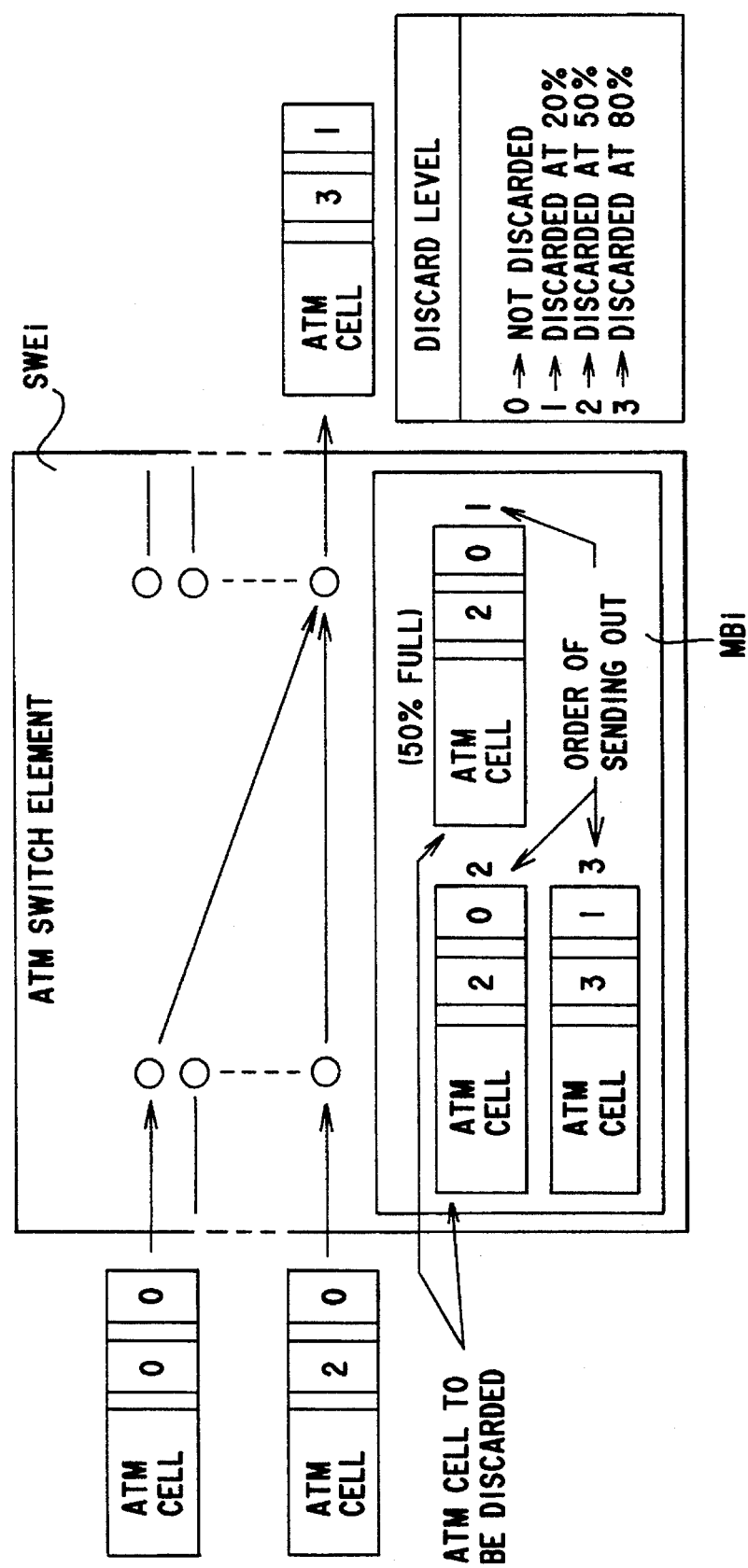
FIG. 12 is an explanatory diagram of the principle of a tenth modified aspect of the aspect shown in FIGS. 2a and 2b.

FIG. 12 illustrates the tenth modified aspect of the aspect shown in FIGS. 2a and 2b.

In FIG. 12, assuming that two new ATM cells arrive at an ATM switch element SWEi. If there are a plurality of ATM cells whose conditions signified by the discard level setting fields are satisfied, ATM cells are discarded in such an order that an ATM cell to be sent out first is discarded first.

Figure 13:
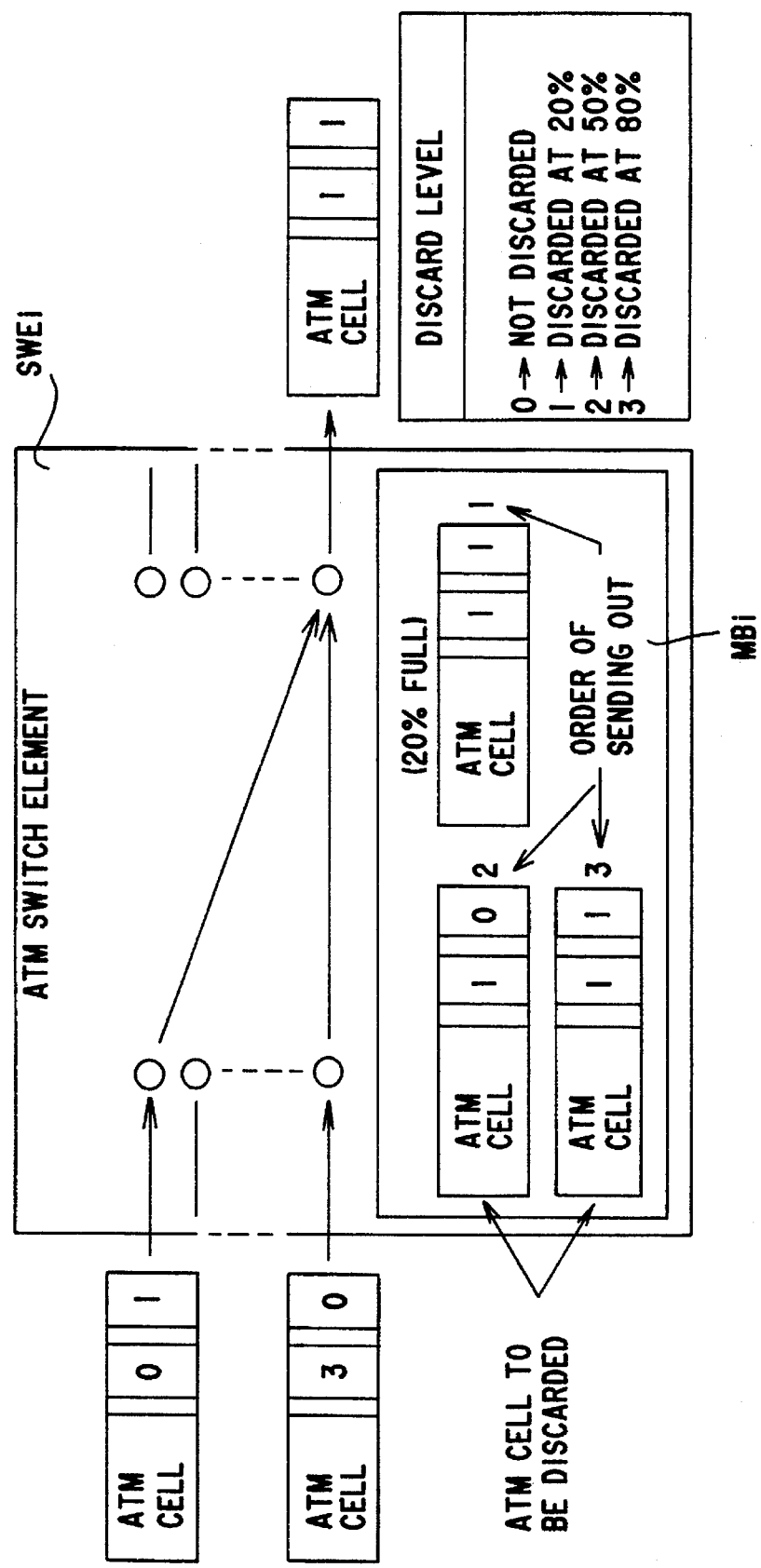
FIG. 13 is an explanatory diagram of the principle of an eleventh modified aspect of the aspect shown in FIGS. 2a and 2b.

FIG. 13 illustrates the eleventh modified aspect of the aspect shown in FIGS. 2a and 2b.

In FIG. 13, assuming that two new ATM cells arrive at an ATM switch element SWEi. If there is only one ATM cell whose condition signified by the discard level setting field is satisfied, the ATM cell and an ATM cell having the second lowest priority level are discarded.

Figure 14:
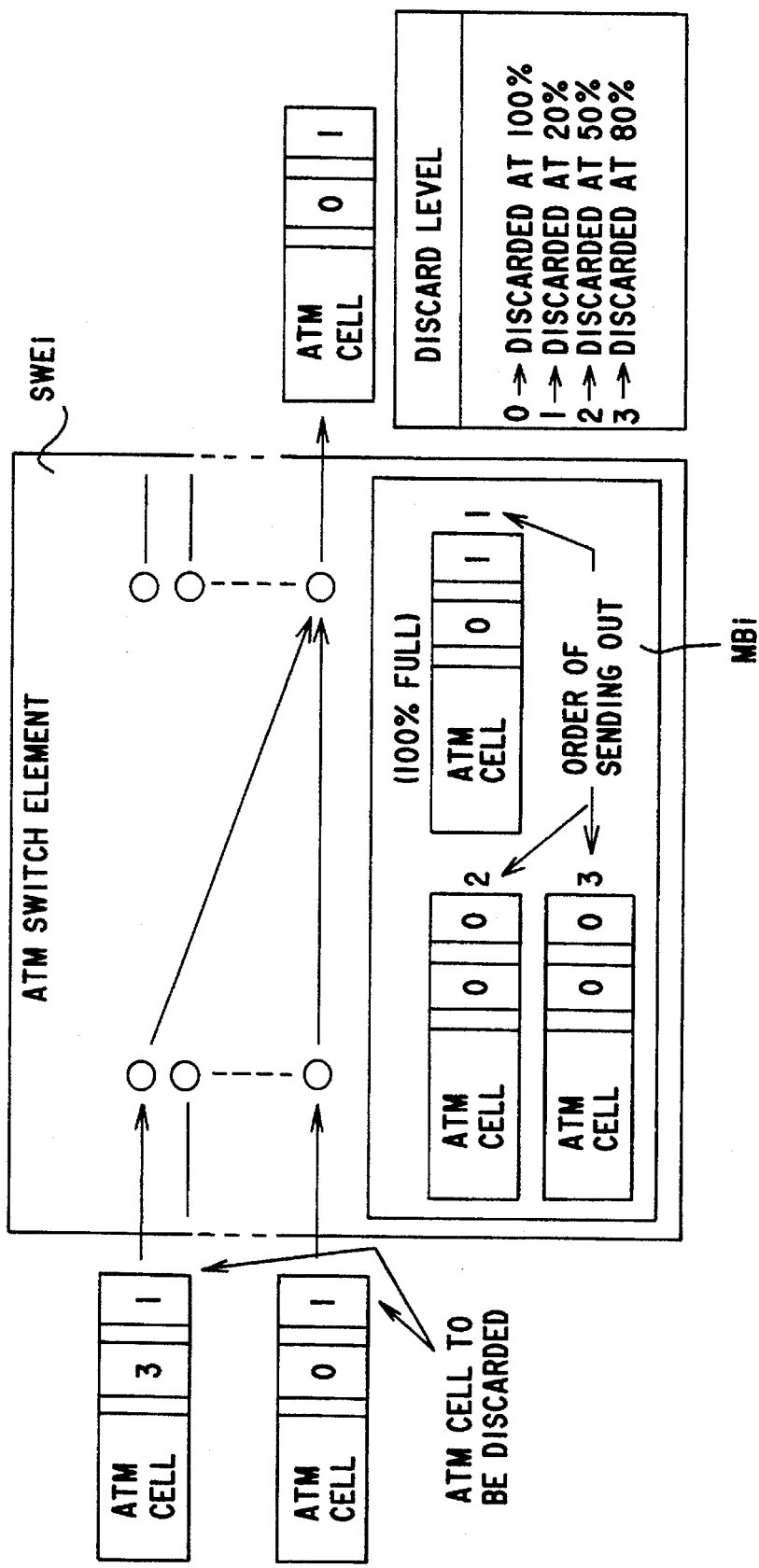
FIG. 14 as an explanatory diagram of the principle of a twelfth modified aspect of the aspect shown in FIGS. 2a and 2b.

FIG. 14 illustrates the twelfth modified aspect of the aspect shown in FIGS. 2a and 2b.

In FIG. 14, assuming that two new ATM cells arrive at an ATM switch element SWEi. When a memory buffer MBi is full, the newly arrived ATM cells are discarded unconditionally.

Figure 15:
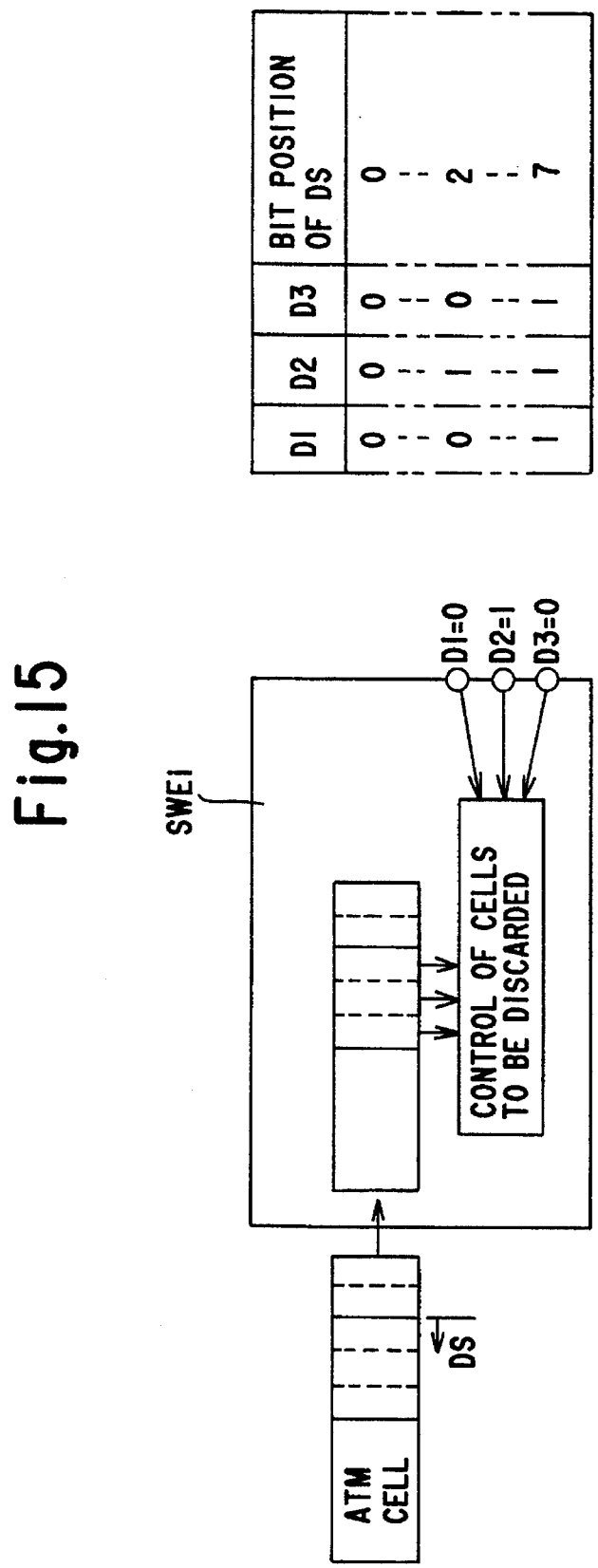
FIG. 15 is an explanatory diagram of the principle of a thirteenth modified aspect of the aspect shown in FIGS. 2a and 2b.

FIG. 15 illustrates the thirteenth modified aspect of the aspect shown in FIGS. 2a and 2b.

In FIG. 15, a discard cell control unit receives input signals of terminals D1 to D3 and thus recognizes the head bit position of a discard level setting bit field DS.

Figure 16:
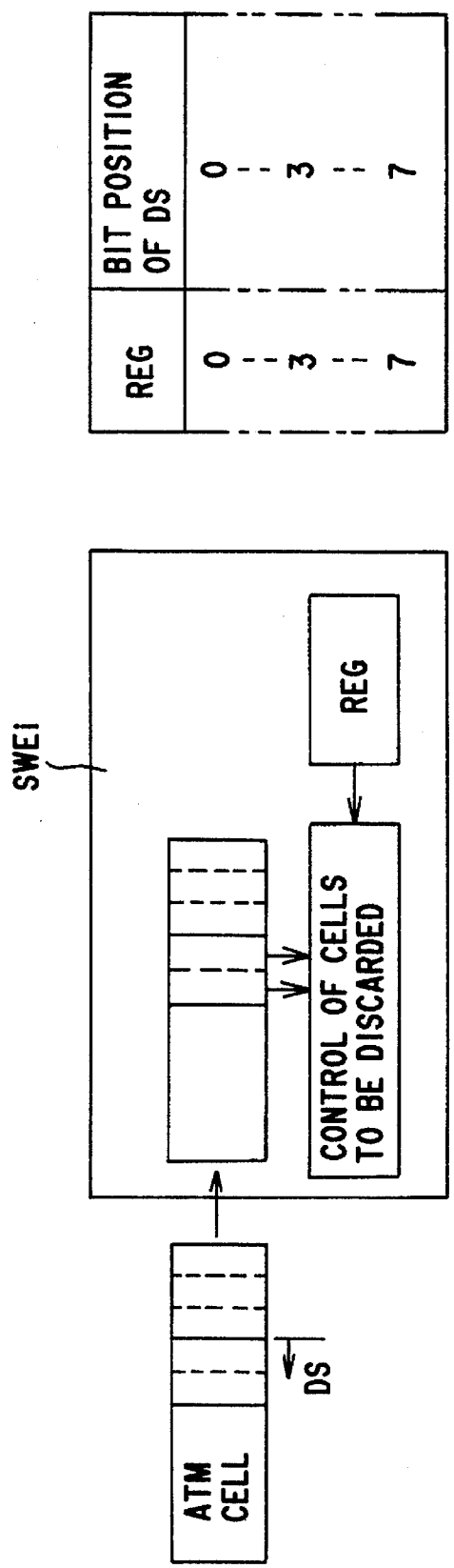
FIG. 16 is an explanatory diagram of the principle of a fourteenth modified aspect of the aspect shown in FIGS. 2a and 2b.

FIG. 16 illustrates the fourteenth modified aspect of the aspect shown in FIGS. 2a and 2b.

In FIG. 16, a discard cell control unit reads a value from a control register REG incorporated in an ATM switch element SWEi and thus recognizes the head bit position of a discard level setting bit field DS.

Figure 17:
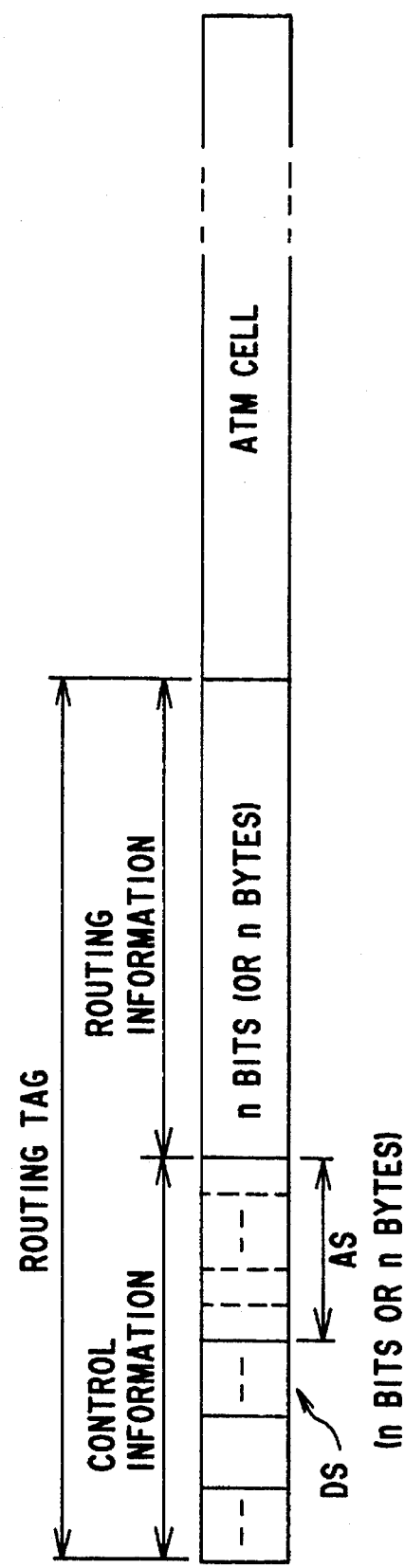
FIG. 17 is an explanatory diagram of the principle of a fifteenth modified aspect of the aspect shown in FIGS. 2a and 2b.

FIG. 17 illustrates the fifteenth modified aspect of the aspect shown in FIGS. 2a and 2b.

The illustration shows a format of a routing tag allowing control information in a routing tag to be padded with a size field AS (n bits or n bytes) signifying the size of routing information.

Figure 18:
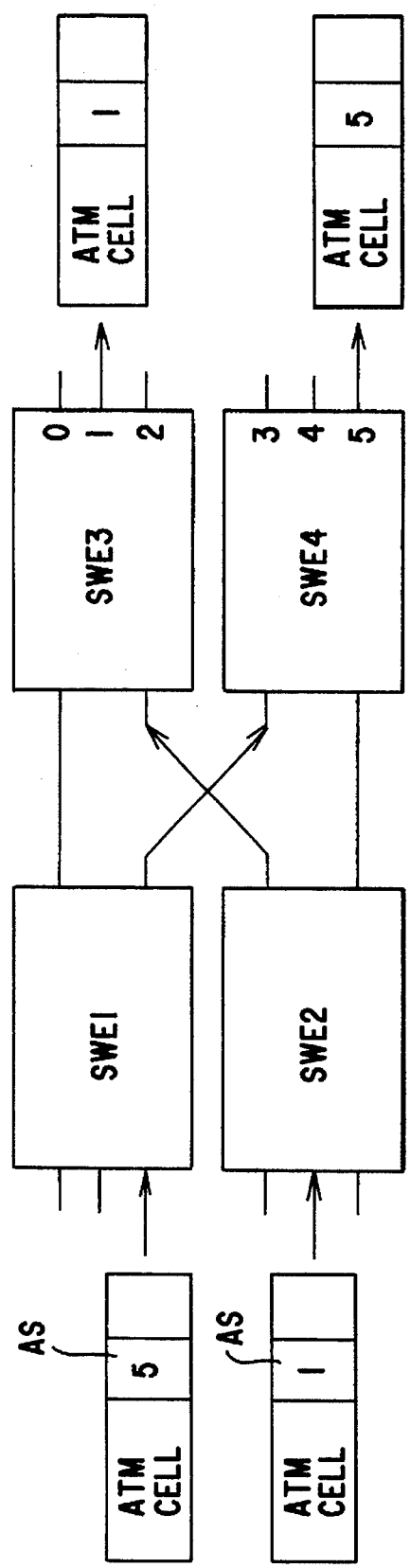
FIG. 18 is an explanatory diagram of the principle of a sixteenth modified aspect of the aspect shown in FIGS. 2a and 2b.

FIG. 18 illustrates the sixteenth modified aspect of the aspect shown in FIGS. 2a and 2b.

In FIG. 18, channel values of exits in final ATM switch elements (SWE3, SWE4) can be set as address values of the routing information size field AS.

Figure 19:
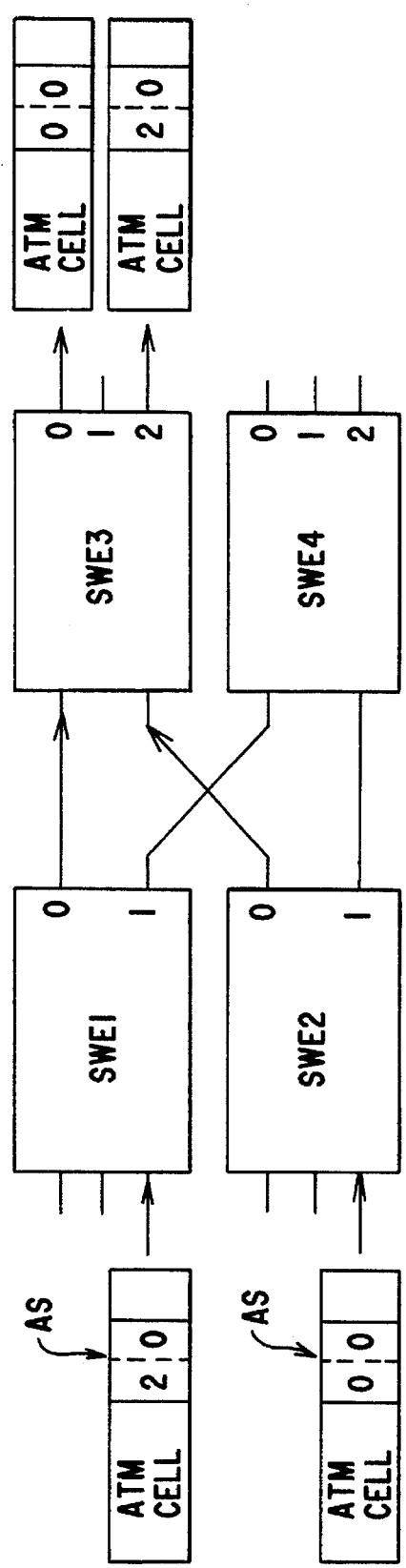
FIG. 19 is an explanatory diagram of the principle of a seventeenth modified aspect of the aspect shown in FIGS. 2a and 2b.

FIG. 19 illustrates the seventeenth modified aspect of the aspect shown in FIGS. 2a and 2b.

In FIG. 19, channel values of exits in ATM switch elements through which an ATM cell passes can be set sequentially as address values of the routing information size field AS.

Figure 20:
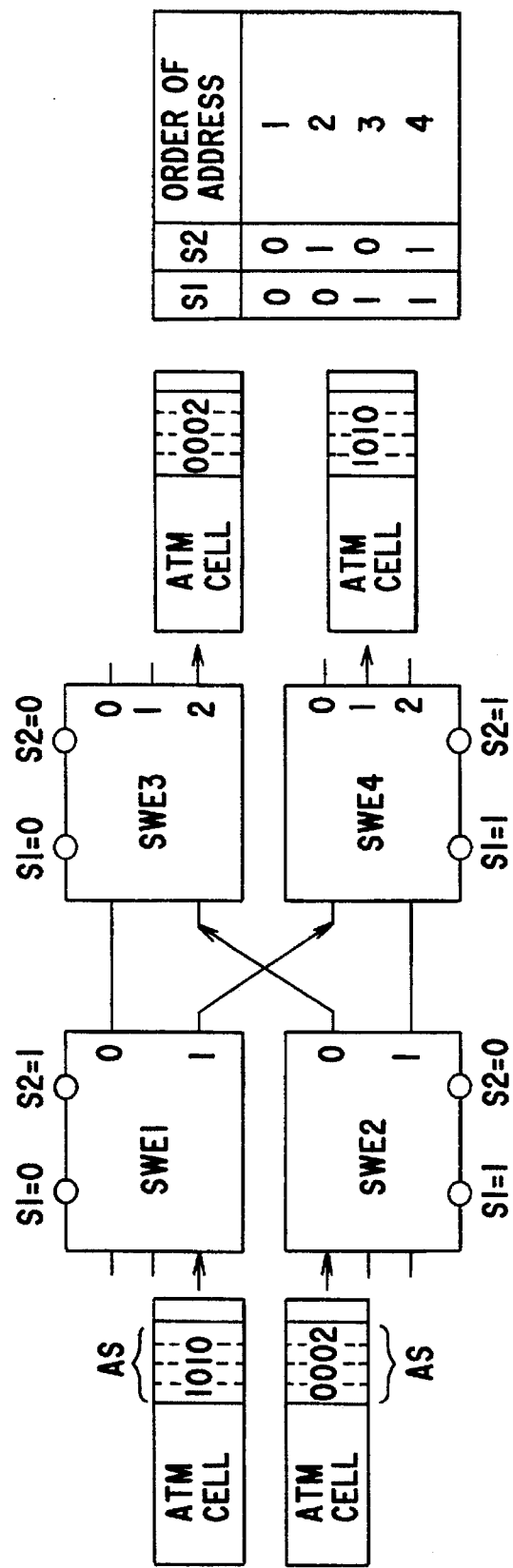
FIG. 20 is an explanatory diagram of the principle of an eighteenth modified aspect of the aspect shown in FIGS. 2a and 2b.

FIG. 20 illustrates the eighteenth modified aspect of the aspect shown in FIGS. 2a and 2b.

In FIG. 20, an address in the routing information which each ATM switch element uses for switching can be designated according to logical states of respective terminals S1 and S2.

Figure 21:
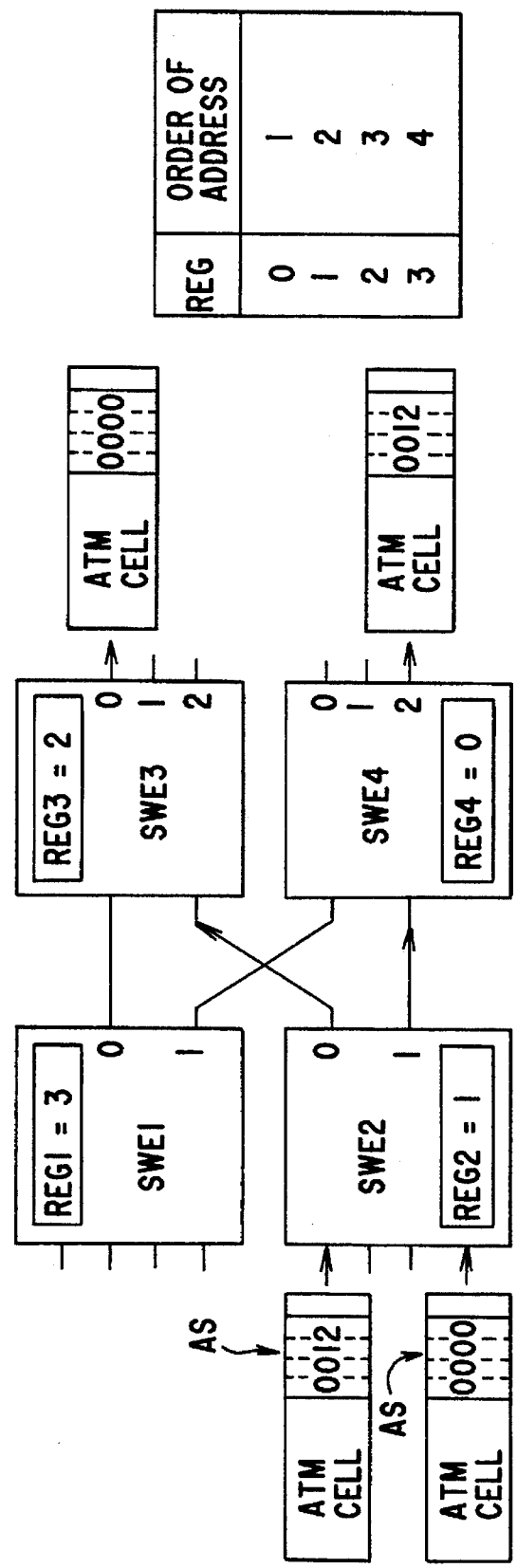
FIG. 21 is an explanatory diagram of the principle of a nineteenth modified aspect of the aspect shown in FIGS. 2a and 2b.

FIG. 21 illustrates the nineteenth modified aspect of the aspect shown in FIGS. 2a and 2b.

In FIG. 21, an address in the routing information which each ATM switch element uses for switching can be designated according to a value stored in respective control registers REG1 to REG4.

Figure 22A:
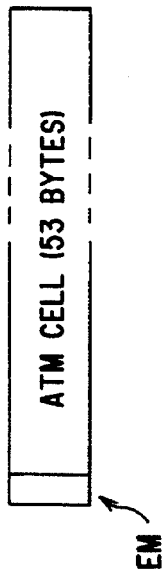
FIGS. 22a and 22b are explanatory diagrams of the principle of the ATM switching device according to a second aspect of the present invention.
Figure 22B:
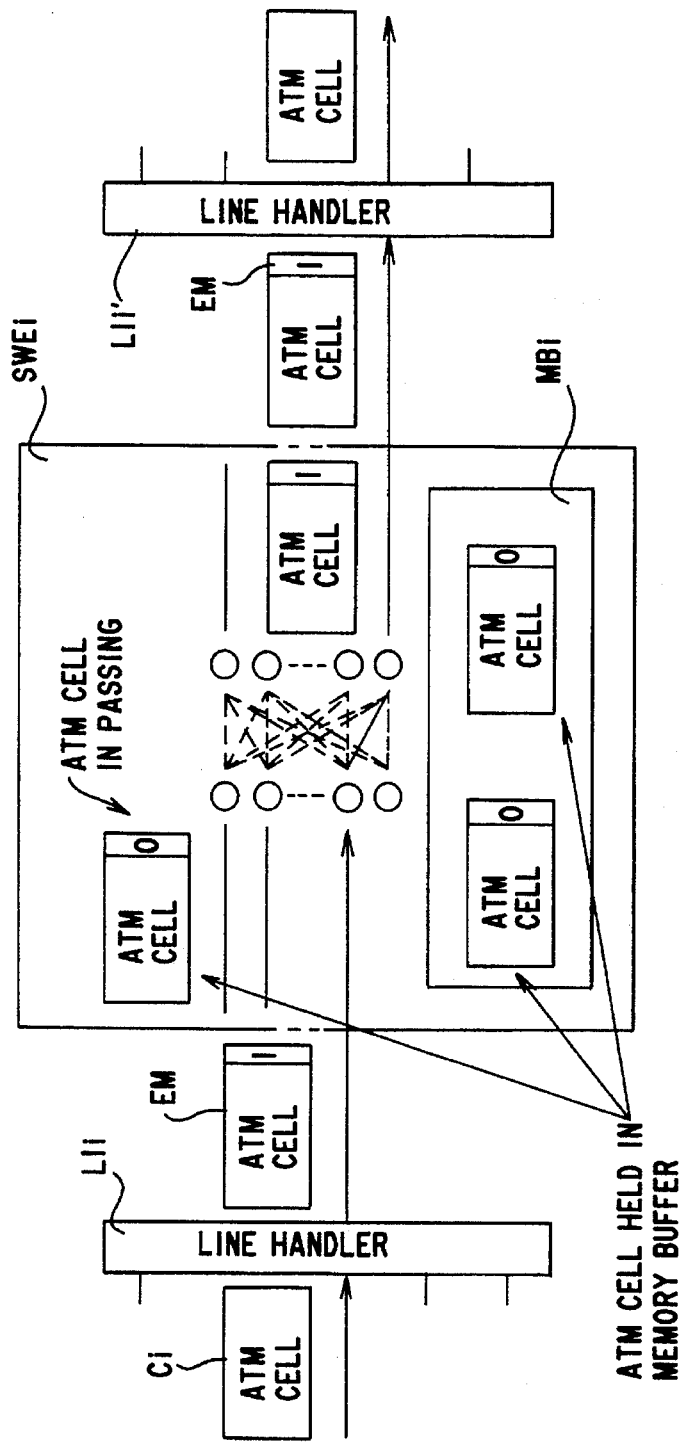

FIGS. 22a and 22b illustrate the ATM switching device according to the second aspect of the present invention.

As illustrated, the ATM switching device includes at least one ATM switch element SWEi, and means (line handler L1i) for appending an emergency identification bit EM indicating whether or not an incoming ATM cell Ci is an urgent ATM cell, to the head of the ATM cell. When an ATM cell whose emergency identification bit represents a given logical value arrives at the ATM switch element SWEi, the ATM switch element SWEi holds all of ATM cells, other than ATM cells whose emergency identification bits represent the given logical values and which reside in the ATM switch element, in a congestion control memory buffer MBi, so as to effect a switching of the urgent ATM cell as a top priority.

Figure 23A:
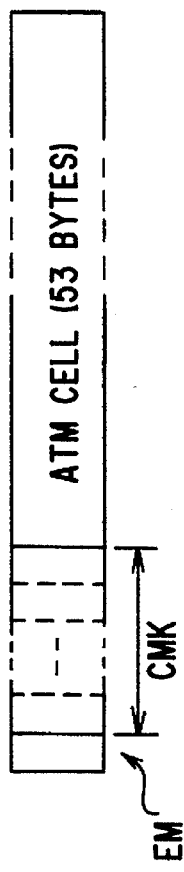
FIGS. 23a and 23b are explanatory diagrams of the principle of a first modified aspect of the aspect shown in FIGS. 22a and 22b.
Figure 23B:
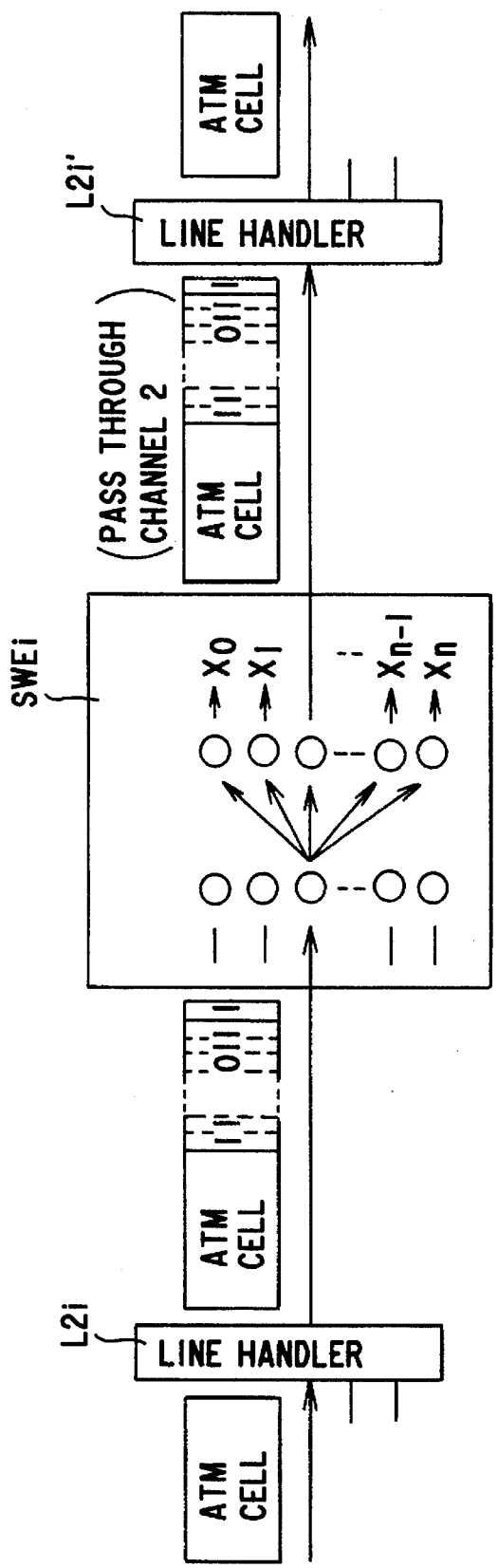

FIGS. 23a and 23b illustrate the first modified aspect of the aspect shown in FIGS. 22a and 22b.

FIG. 23a illustrates a format allowing an emergency identification bit EM to be padded with a trailing field of channel mask bits CMK for use in masking exit channels of an switch element SWEi. FIG. 23b illustrates the principle of operation based on the format shown in FIG. 23a. In FIG. 23b, a line handler L2i refers to header information (destination address) of an ATM cell so as to determine whether the ATM cell is an urgent ATM cell, and sets an emergency identification bit EM to a given logical value. In this example, the emergency identification bit EM is set to "1". When the urgent ATM cell arrives at the ATM switch element SWEi, the ATM switch element SWEi holds all of ATM cells, whose emergency identification bits are not set to "1", in a memory buffer (not shown) in the switch element. The switch element SWEi does not switch the ATM cell, but transfers it to all exit channels so as to handle all channels as transmission destinations of the ATM cell. The urgent ATM cell passes through the channels whose associated channel mask bits are not set to "1".

Figure 24A:
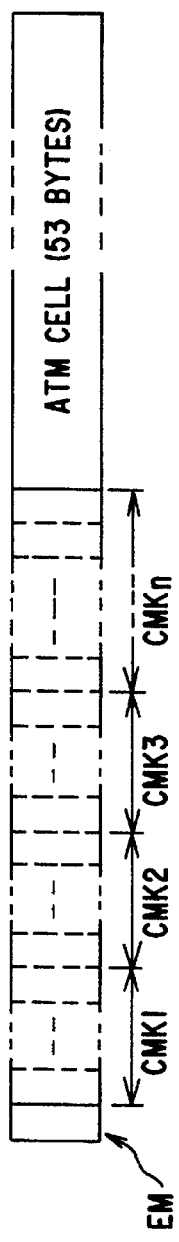
FIGS. 24a and 24b are explanatory diagrams of the principle of a second modified aspect of the aspect shown in FIGS. 22a and 22b.
Figure 24B:
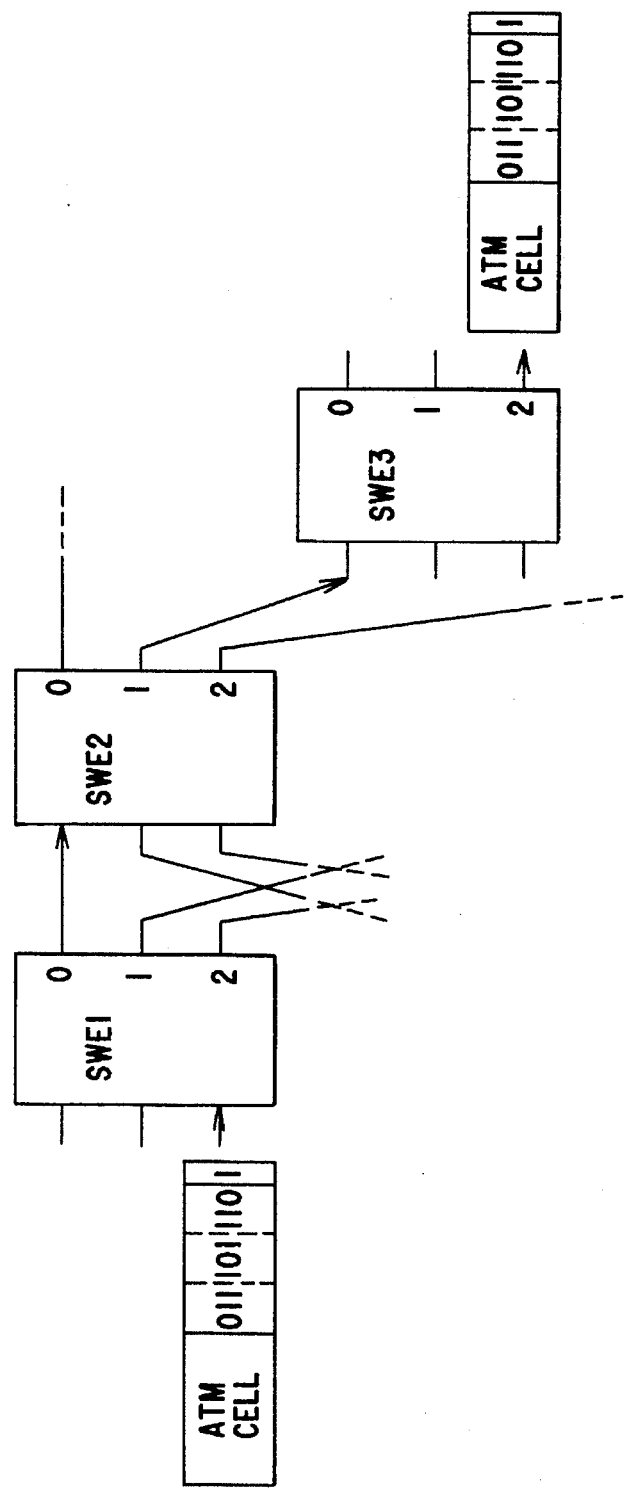

FIGS. 24a and 24b illustrate the second modified aspect of the aspect shown in FIGS. 22a and 22b.

FIG. 24a illustrates a format, where an urgent ATM cell passes through a plurality of ATM switch elements SWE1 to SWE3, allowing the ATM cell to be padded with channel mask fields CMKi associated with the respective switch elements. FIG. 24b illustrates the principle of operation based on the format shown in FIG. 24a. The order of channel mask fields CMK1 to CMKn corresponds to the order of each switch element through which the urgent ATM cell passes.

Figure 25:
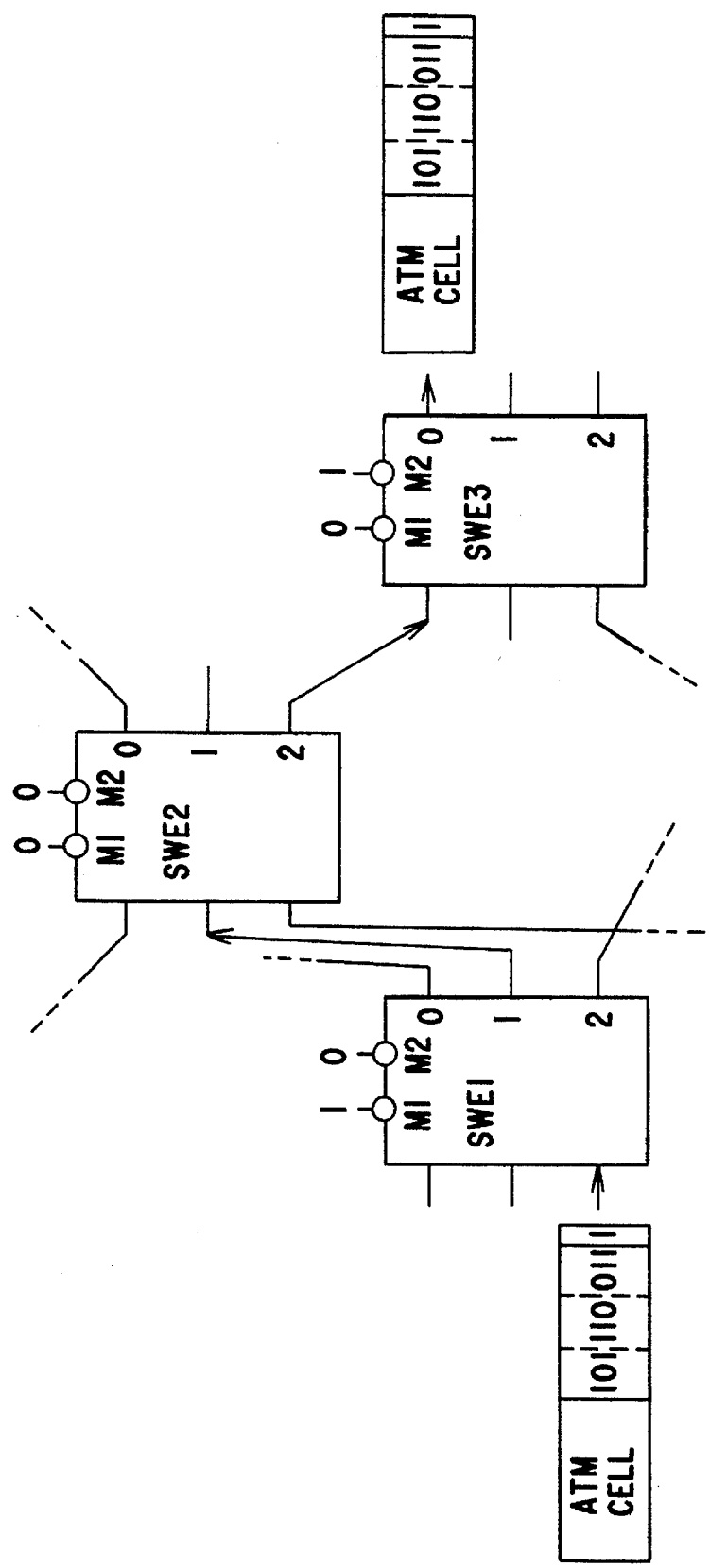
FIG. 25 is an explanatory diagram of the principle of a third modified aspect of the aspect shown in FIGS. 22a and 22b.

FIG. 25 illustrates the third modified aspect of the aspect shown in FIGS. 22a and 22b.

FIG. 25 illustrates the principle of operation based on the format shown in FIG. 24a. A channel mask bit field to be employed can be designated according to logical levels of input signals of terminals M1 and M2 provided in respective switch elements SWE1 to SWE3.

Figure 26:
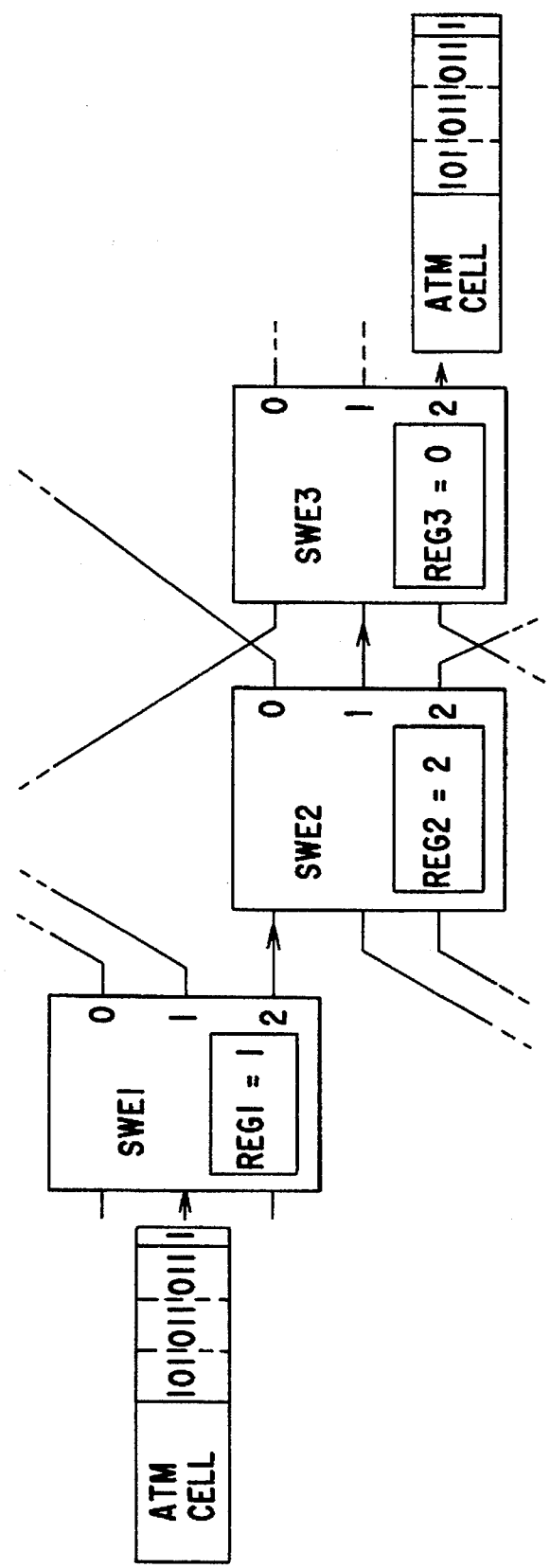
FIG. 26 is an explanatory diagram of the principle of a fourth modified aspect of the aspect shown in FIGS. 22a and 22b.

FIG. 26 illustrates the fourth modified aspect of the aspect shown in FIGS. 22a and 22b.

FIG. 26 illustrates the principle of operation based on the format shown in FIG. 24a. A channel mask bit field to be employed can be designated according to a value stored in a corresponding one of control registers REG1 to REG3 incorporated in the switch elements SWE1 to SWE3.

Figure 27:
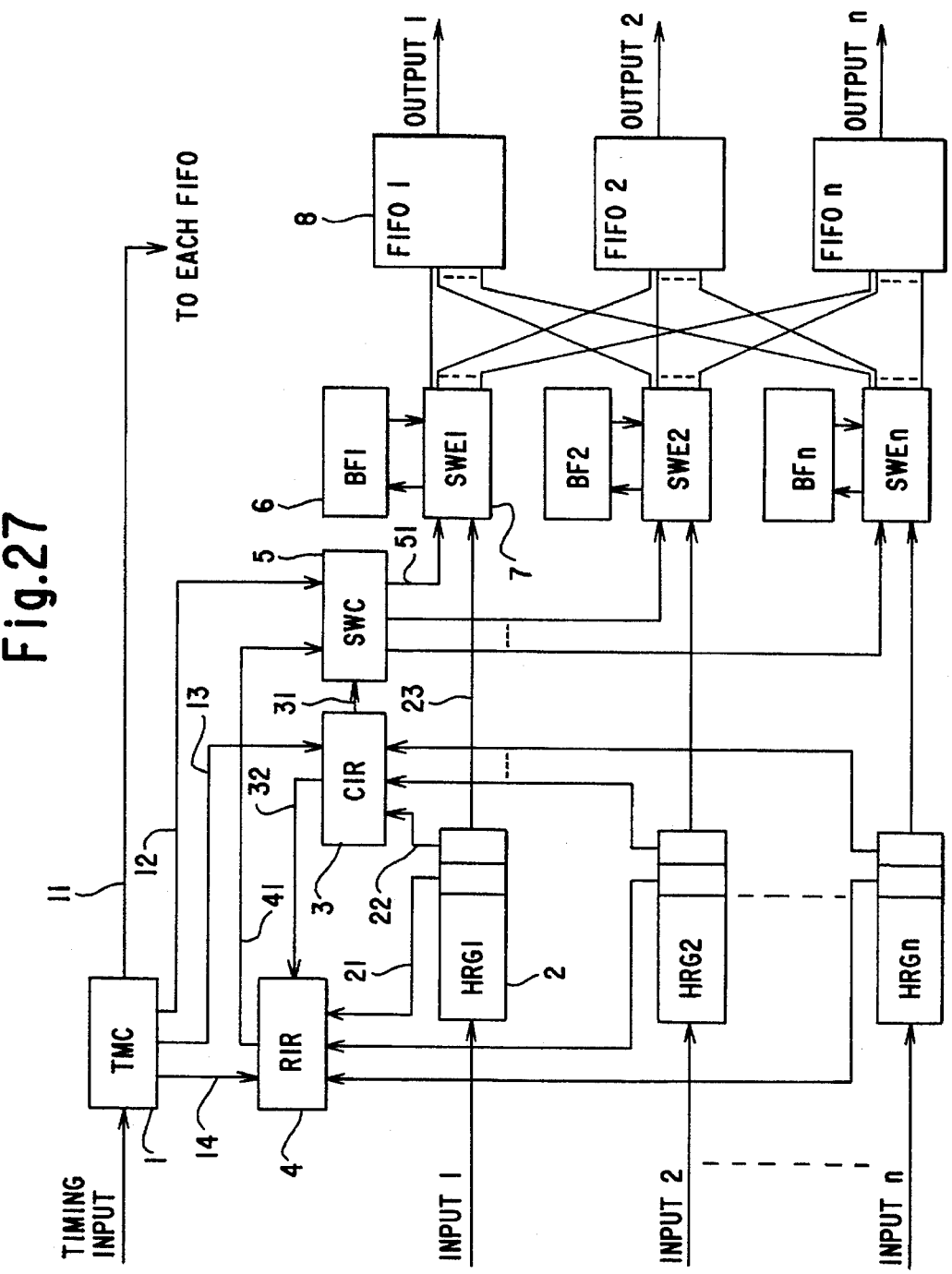
FIG. 27 is a block diagram illustrating an overall configuration of the ATM switching device according to the aspect shown in FIGS. 2a and 2b.

FIG. 27 illustrates an overall configuration of an ATM switching device according to the aspect shown in FIGS. 2a and 2b.

In FIG. 27, reference 1 denotes a timing control unit (TMC) that receives a timing signal prompting an input of an ATM cell from an external device, and supplies control information identification data, routing information identification data, a cell switching-on timing signal, and a cell output timing signal, respectively, to a control information recognition unit 3, a routing information recognition unit 4, a switching control unit 5, and FIFO memories 8; reference 2 denotes a holding register HRGi for temporarily holding an ATM cell until the control information recognition unit 3 and the routing information recognition unit 4 recognize control information identification data and routing information identification data, respectively, and for outputting the ATM cell to a corresponding switch element after completion of the recognition; reference 3 denotes a control information recognition unit (CIR) that recognizes priority setting control data, a bit length of a priority setting bit field, and discard control data which constitute control information in the routing tag, posts them to a switching control unit 5. The control information recognition unit 3 also recognizes the size of the routing information and posts it to the routing information recognition unit 4; reference 4 denotes a routing information recognition unit (RIR) that recognizes an address or addresses set as routing information in the routing tag according to information concerning the size of routing information sent from the control information recognition unit 3; reference 5 denotes a switching control unit (SWC) for controlling switching of an ATM cell according to information sent from the control information recognition unit 3 and the routing information recognition unit 4; reference 6 denotes a buffer (BFi) which, when a corresponding switch element SWEi inputs many ATM cells, holds the ATM cells until they are switched; reference 7 denotes a switch element (SWEi) for switching an ATM cell in response to an instruction sent from the switching control unit 5 and outputting the ATM cell to a corresponding FIFO (first-in, first-out) memory; and reference 8 denotes a FIFO memory for outputting the input ATM cells sequentially in response to a timing signal sent from the timing control unit 1.

Also, reference 11 denotes a signal line over which a timing signal prompting an output of an ATM cell is supplied to each FIFO memory 8; reference 12 denotes a signal line over which a timing signal prompting a switching of an ATM cell is supplied to the switching control unit 5; reference 13 denotes a signal line over which a timing signal prompting a recognition of control information in the routing tag is supplied to the control information recognition unit 3; reference 14 denotes a signal line over which a timing signal prompting a recognition of routing information in the routing tag is supplied to the routing information recognition unit 4; reference 21 denotes a signal line over which routing information is posted to the routing information recognition unit 4; reference 22 denotes a signal line over which control information is posted to the control information recognition unit 3; reference 23 denotes a signal line over which an ATM cell travels; reference 31 denotes a signal line over which information needed for controlling an ATM cell (priority setting control or discard control) is posted; reference 41 denotes a signal line over which information needed for switching an ATM cell is posted; and reference 51 denotes a signal line over which control is passed so that an ATM cell of each switch element SWEi can be switched or it can be stored in the corresponding buffer.

Next, an embodiment of the present invention to be implemented in the ATM switching device shown in FIG. 27 will be explained in detail with reference to FIGS. 28 to 30.

Figure 28:
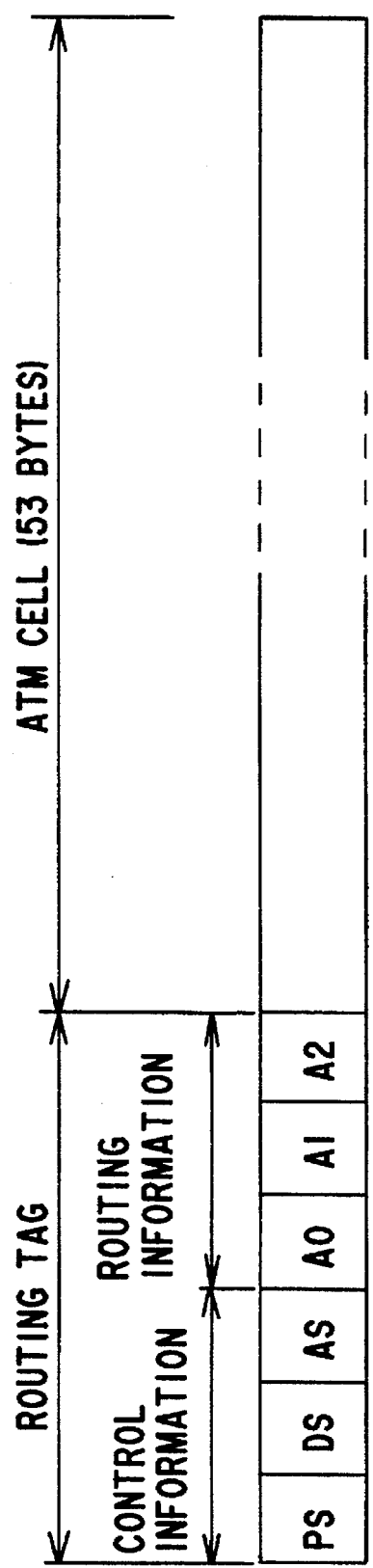
FIG. 28 is an explanatory diagram of an embodiment of the present invention to be implemented in the ATM switching device shown in FIG. 27.

FIG. 28 illustrates a format of the routing tag relating to this embodiment; FIGS. 29a to 29d illustrate the manner in which each switch element effects a switching operation using the format shown in FIG. 28; and FIG. 30 illustrates the manner in which an ATM cell is discarded in a switch element.

In the routing tag shown in FIG. 28, reference PS denotes a priority setting bit which represents "0" so as to indicate a normal level, and which represents "1" so as to indicate a high level. Also, reference DS denotes a discard level setting bit which represents "0" so as to indicate discard under the condition that a memory buffer is 100% full, and which represents "1" so as to indicate discard under the condition that the memory buffer is 50% full. Also, reference AS denotes a routing information size field of a predetermined number of bytes long. Also, references A0 to A2 denote addresses for setting channel values of exits of each switch element.

Figure 29A:
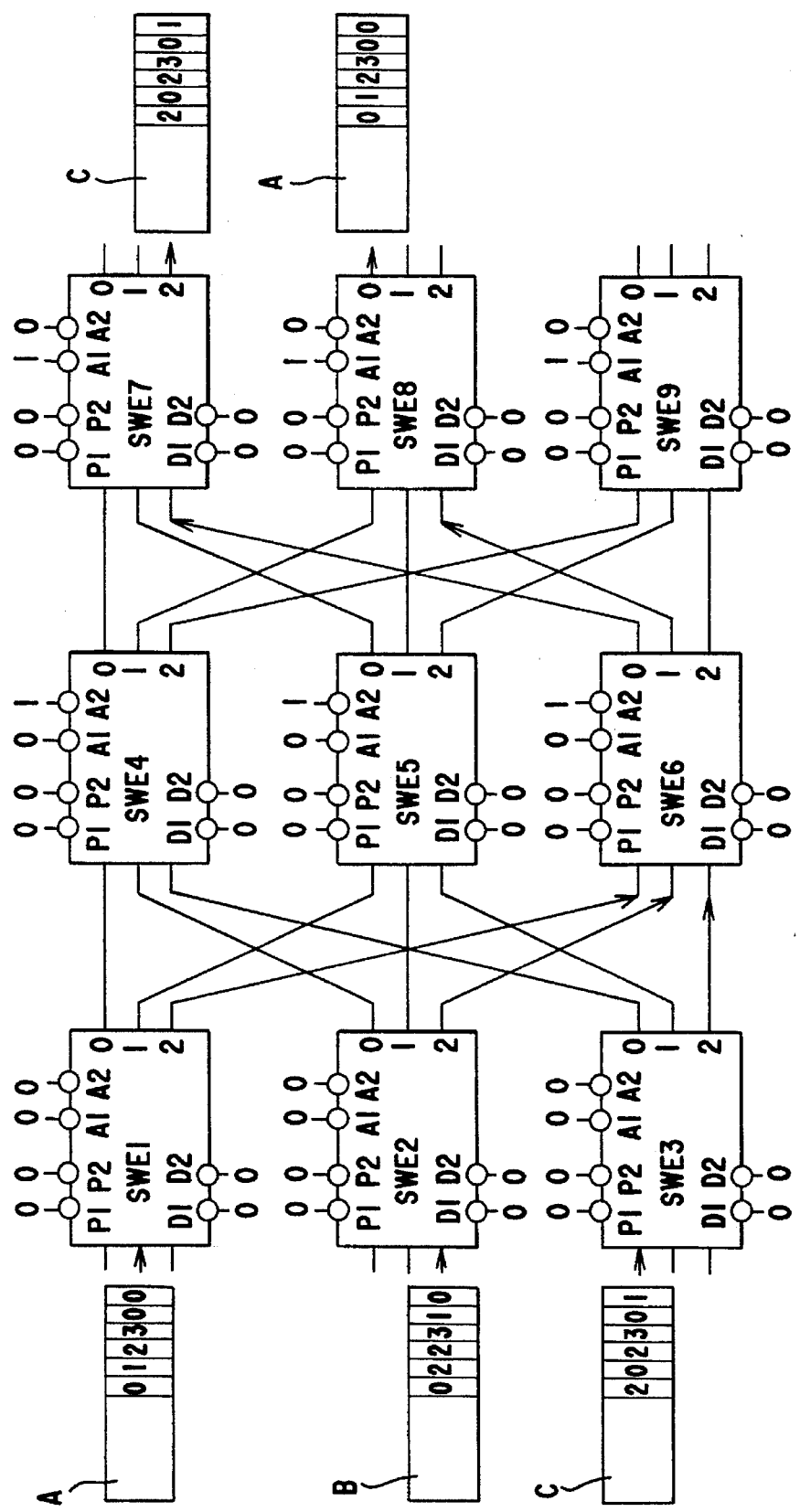

FIG. 29a illustrates a group of switch elements composed of switch elements SWE1 to SWE9 each having three input terminals and three output terminals. In each switch element, terminals P1 and P2 are provided to designate a bit length of a priority setting bit field. In this example, the priority setting bit field is one bit long. Also, terminals A1 and A2 are provided to designate a bit position of an address employed by a switch element concerned. In this example, the terminals A1 and A2 in each of three left-hand switch elements SWE1 to SWE3 designate the first address bit. The terminals A1 and A2 in each of three central switch elements SWE4 to SWE6 designate the second address bit. The terminals A1 and A2 in each of the right-hand switch elements SWE7 to SWE9 designate the third address bit. Also, Terminals D1 and D2 are provided to designate a bit length of a discard level setting bit field. In this example, the discard level setting bit field is one bit long.

Description of the ATM switching operation will proceed on the assumption that three ATM cells A to C simultaneously arrive at the switch elements SWE1 to SWE3, respectively. Each of these ATM cells is appended a routing tag by a line handler (see FIGS. 2a and 2b) in line with the format shown in FIG. 28. The ATM cell A has a normal priority level, is supposed to be discarded under the condition that the memory buffer is 100% full, and includes an address field of three bytes long specifying addresses that cause the ATM cell A to pass through the switch elements SWE1, SWE6, and SWE8 and exit through a channel 0. Also, the ATM cell B has a normal priority level, is supposed to be discarded under the condition that the memory buffer is 50% full, and includes an address field of three bytes long specifying addresses that cause the ATM cell B to pass through the switch elements SWE2, SWE6, and SWE9 and exit through a channel 0. Also, the ATM cell C has a high priority level, is supposed to be discarded under the condition that the memory buffer is 100% full, and includes an address field of three bytes long specifying addresses that cause the ATM cell C to pass through the switch elements SWE3, SWE6, and SWE7 and exit through a channel 2.

Referring to FIG. 29a, the ATM cell B is not sent out of the group of switch elements. This is because the ATM cell B is discarded by the switch element SWE6.

Figure 30:
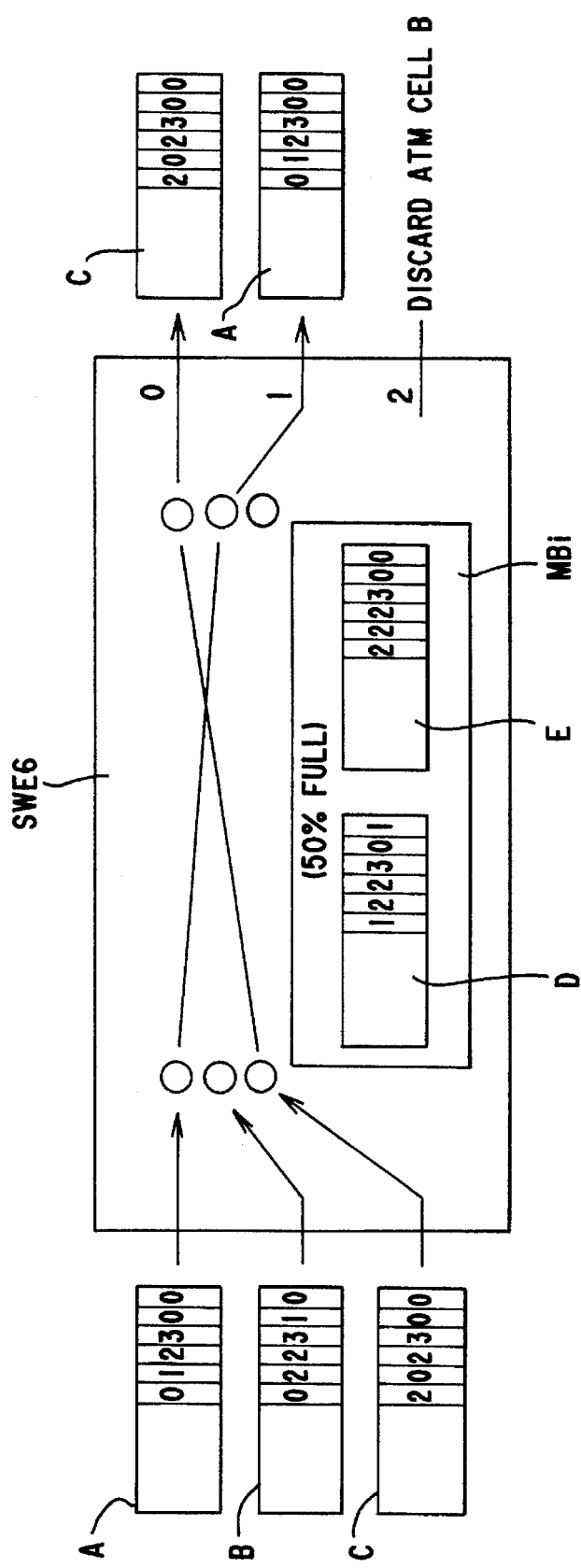
FIG. 30 is a supplementary explanatory diagram of FIG. 28.

FIG. 30 illustrates how the ATM cell B is discarded. It is assumed that three ATM cells A, B, and C simultaneously arrive at the switch element SWE6. The memory buffer MBi in the switch element SWE6 has already been 50% full. The condition signified by the discard level setting bit of the ATM B is therefore satisfied. The ATM cell B is eventually discarded (congestion control). The other ATM cells A and C are not discarded, but are sent out.

As explained above, according to the present embodiment corresponding to the aspect shown in FIGS. 2a and 2b, a routing tag is appended to the head of an incoming ATM cell, and thus it is possible to effect a switching of the ATM cell through ATM switch elements quickly and readily.

Figure 31:
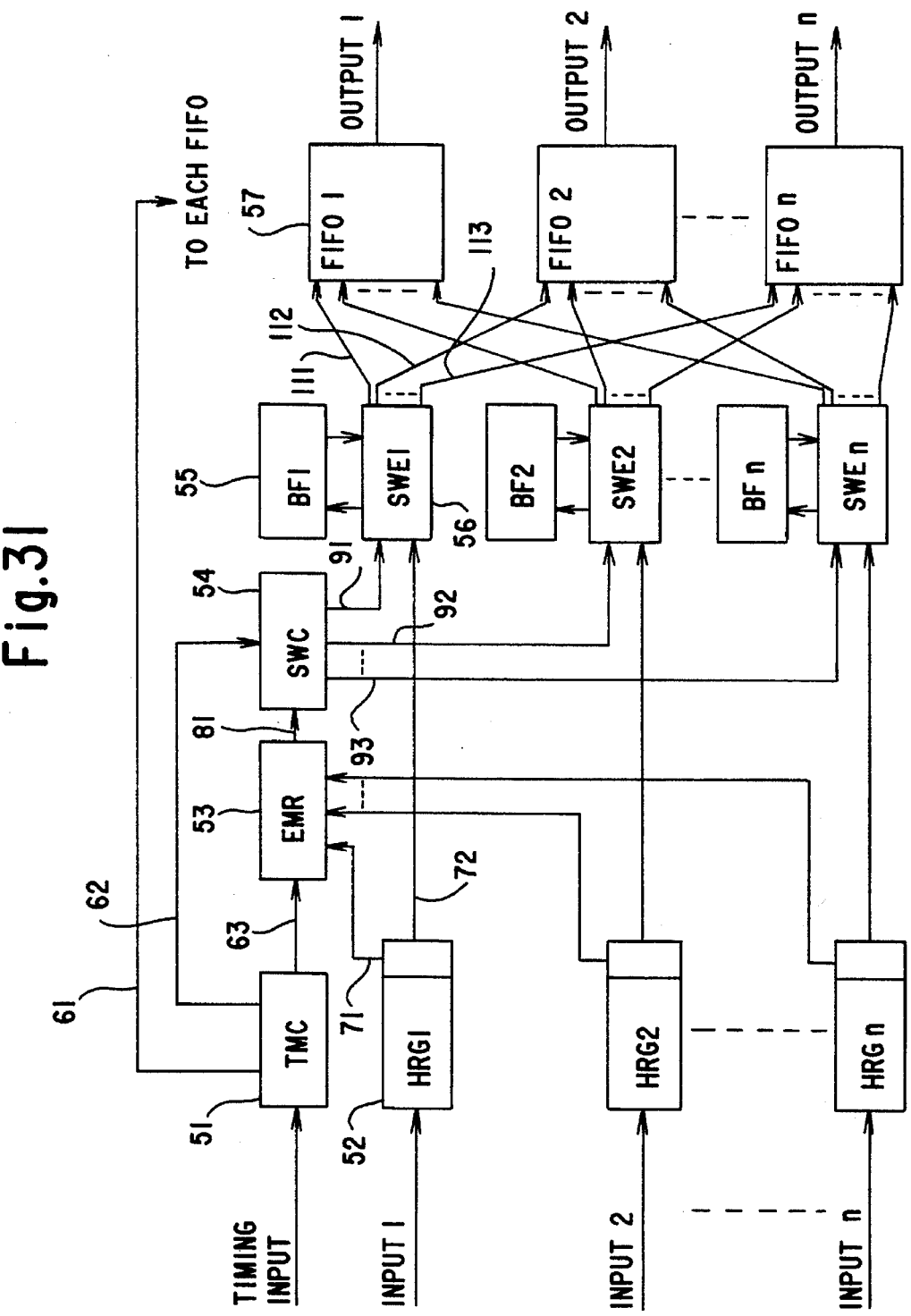
FIG. 31 is a block diagram illustrating an overall configuration of the ATM switching device according to the aspect shown in FIGS. 22a and 22b.

FIG. 31 illustrates an overall configuration of the ATM switching device according to the aspect shown in FIGS. 22a and 22b.

In FIG. 31, reference 51 denotes a timing control unit (TMC) for receiving a timing signal prompting an input of an ATM cell from an external device, and supplying bit identification data, a cell switching timing signal, and a cell output timing signal, respectively, to an urgent ATM cell identification unit 53, a switching control unit 4, and each FIFO memory 57; reference 52 denotes a holding register (HRGi) for temporarily holding an ATM cell until the urgent ATM cell identification unit 53 recognizes an emergency identification bit, and for outputting the ATM cell to a corresponding switch element after completion of the recognition; reference 53 denotes an urgent ATM cell identification unit (EMR) for recognizing an emergency identification bit in an ATM cell held in the holding register 52, and for informing a switching control unit 54 of whether or not the ATM cell is an urgent ATM cell; reference 54 denotes a switching control unit (SWC) that controls switch elements, and that when an urgent ATM cell is input, saves ATM cells in switch elements, which are being switched, into associated buffers until the urgent ATM cell passes through; reference 55 denotes a buffer (BFi) into which ATM cells are saved; reference 56 denotes a switch element (SWEi) which switches an ATM cell in response to an instruction sent from the switching control unit 54, and outputs the ATM cell to a corresponding FIFO memory; and reference 57 denotes a FIFO memory for outputting the input ATM cells one by one in response to a timing signal sent from the timing control unit 1.

Also, reference 61 denotes a signal line over which a timing signal prompting an output of an ATM cell is supplied to each FIFO memory; reference 62 denotes a signal line over which a timing signal prompting a switching of an ATM cell is supplied to the switching control unit 54; reference 63 denotes a signal line over which a timing signal prompting a recognition of an emergency identification bit is supplied to the urgent ATM cell identification unit 53; reference 71 denotes a signal line over which a logical value of an emergency identification bit is posted to the urgent ATM cell identification unit 53; reference 72 denotes a signal line over which an ATM cell travels; reference 81 denotes a signal line over which whether or not an input ATM cell is an urgent ATM cell is posted to the switching control unit 54; references 91 to 93 denote signal lines over which control are passed so that respective switch elements SWE1, SWE2, . . . , and SWEn can switch ATM cells and save them in the buffers, respectively; and references 111 to 113 denote signal lines over which ATM cells switched by the switch element SWE1 travel as outputs 1, 2, . . . , and n, respectively.

Figure 32:
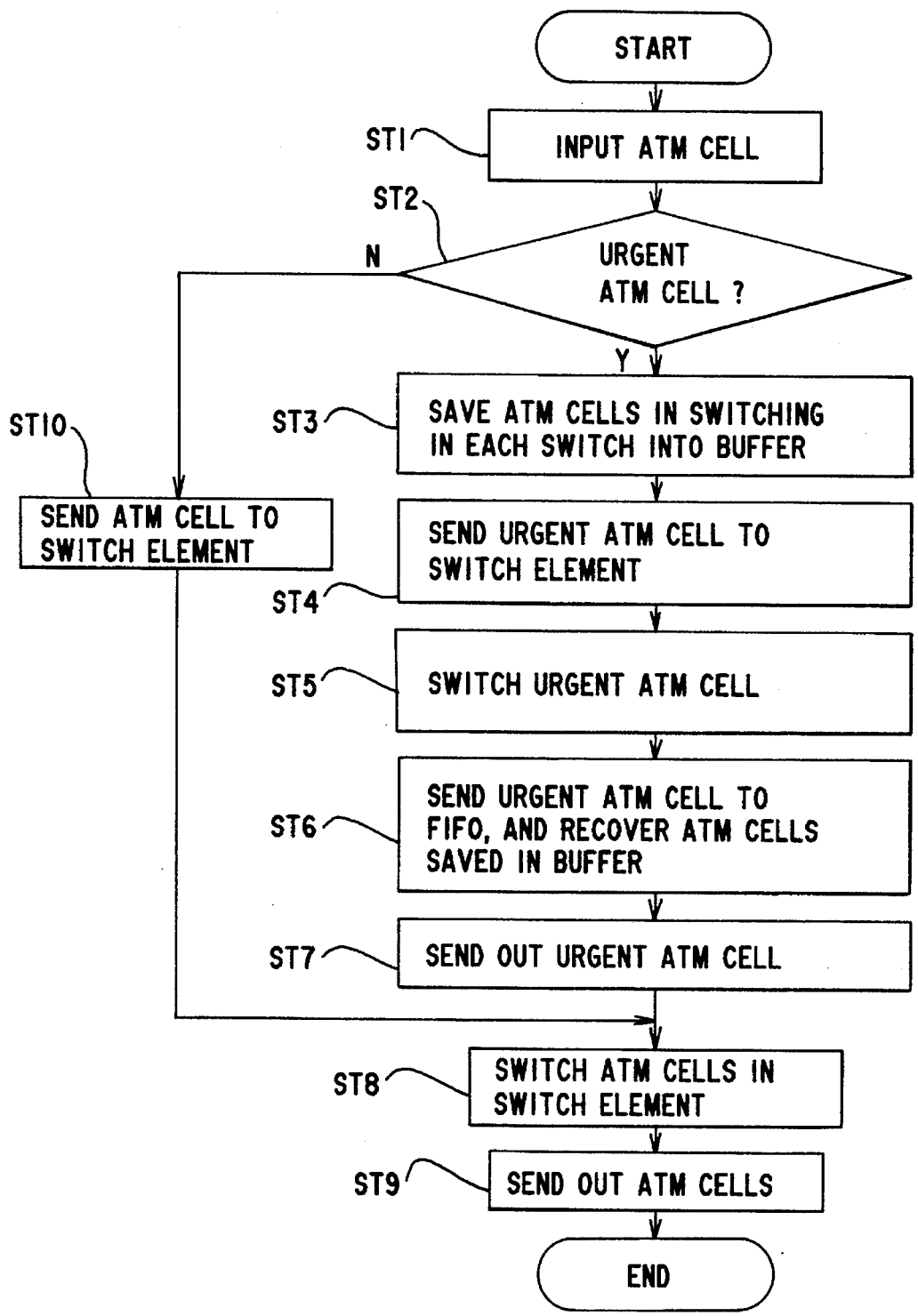
FIG. 32 is a flowchart representing the ATM switching processing executed by the ATM switching device shown in FIG. 31.

FIG. 32 represents an example of the ATM switching processing executed by the ATM switching device shown in FIG. 31 (see steps ST1 to ST10).

Figure 33:
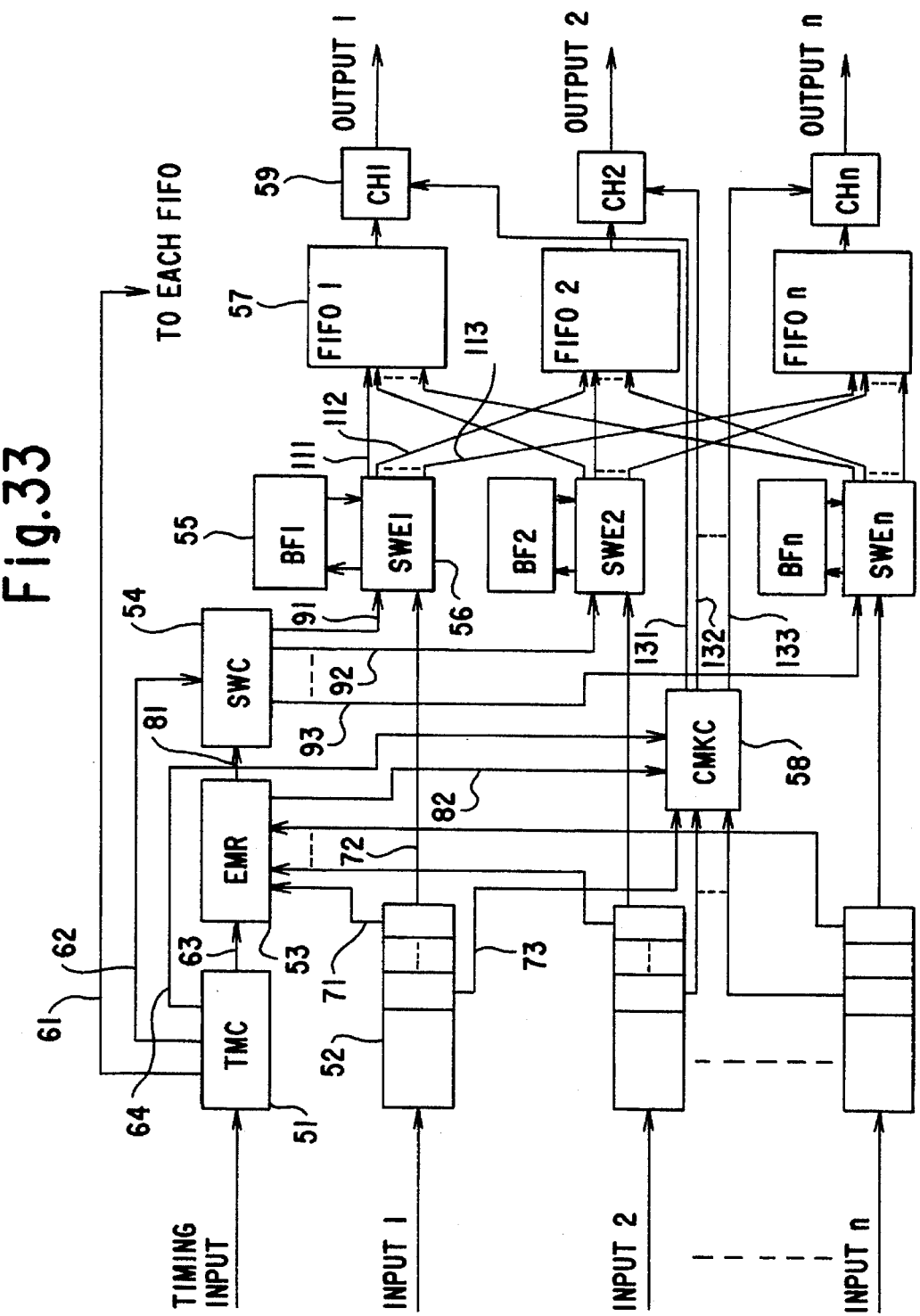
FIG. 33 is a block diagram illustrating an overall configuration of the ATM switching device according to the aspect shown in FIGS. 23a and 23b, or shown in FIGS. 24a and 24b.

FIG. 33 illustrates an overall configuration of the ATM switching device according to the aspect shown in FIGS. 23a and 23b, or shown in FIGS. 24a and 24b.

Compared with the configuration shown in FIG. 31, significant differences lie in: the provision of a channel mask control unit (CMKC) 58 for recognizing channel mask fields in an ATM cell held in the holding register 52, and for masking each channel 59 in response to a signal indicating that an urgent ATM cell has been identified which is sent from the urgent ATM cell identification unit 53; and the provision of channels (CHi) 59 which are masked in order to discard an urgent ATM cell when set in the channel mask fields, and which pass an urgent ATM cell therethrough when not masked.

Figure 34:
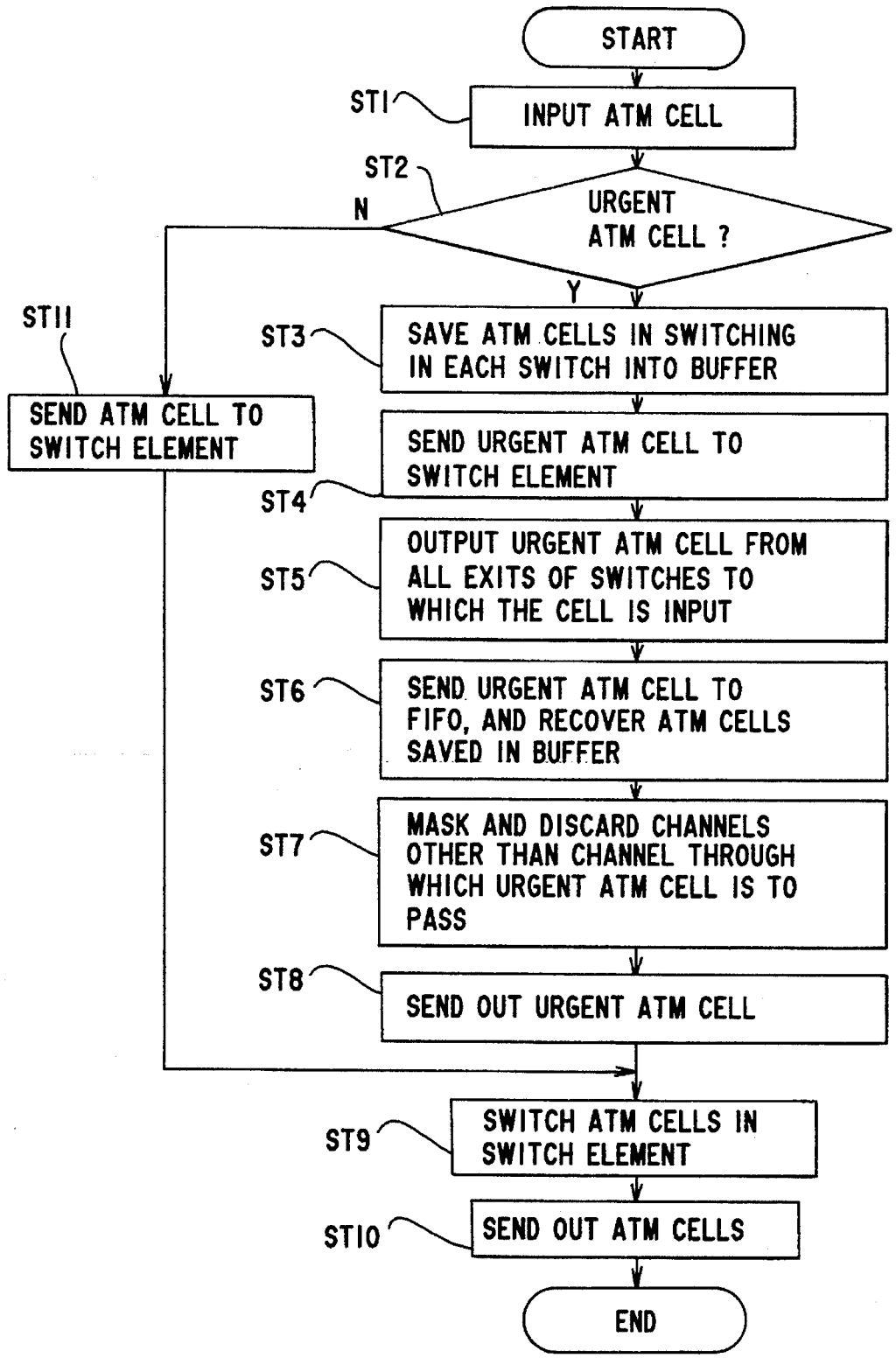
FIG. 34 is a flowchart representing the ATM switching processing executed by the ATM switching device shown in FIG. 33.

FIG. 34 represents an example of the ATM switching processing executed by the ATM switching device shown in FIG. 33 (see steps ST1 to ST11).

Figure 35:
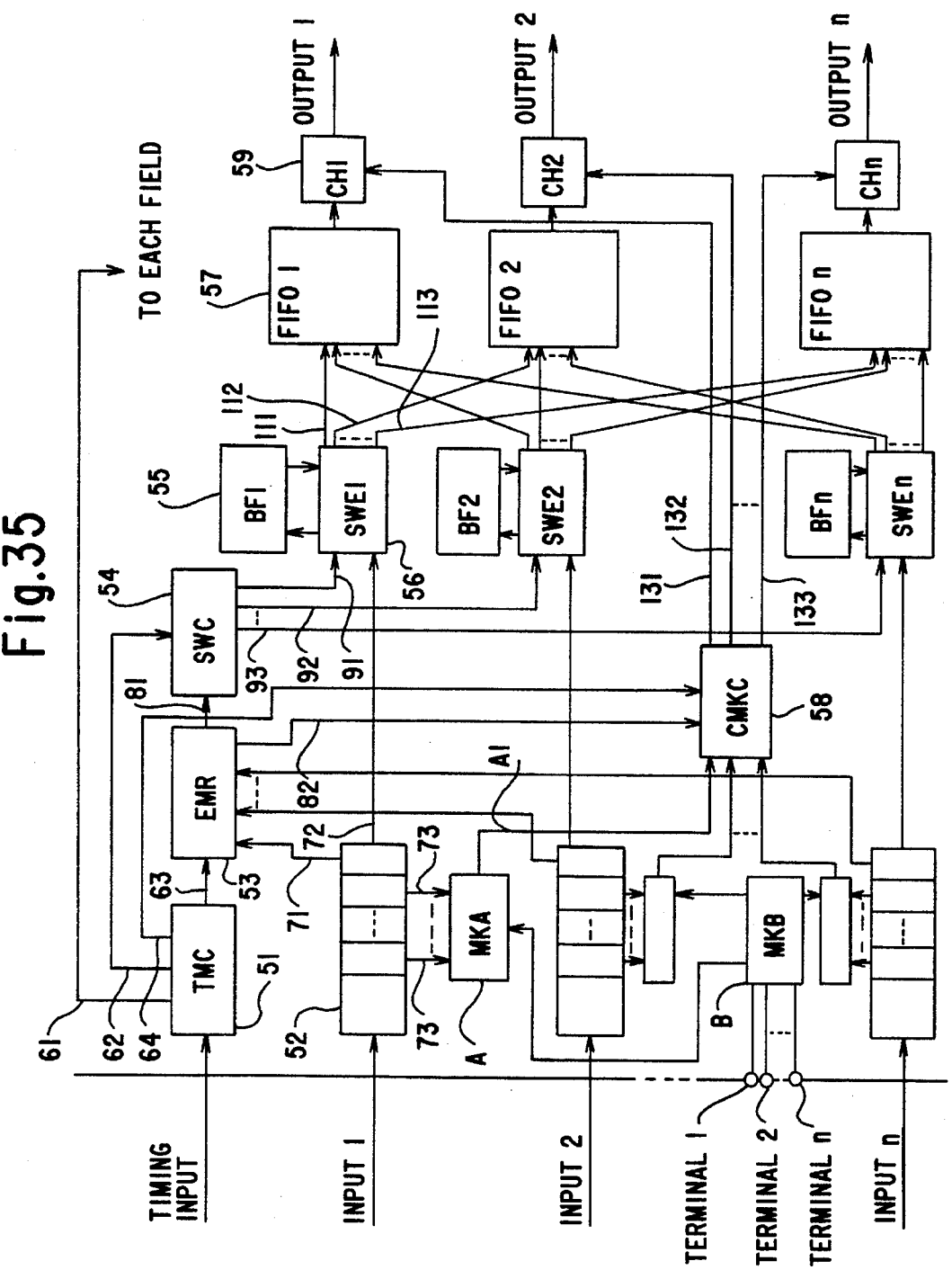
FIG. 35 is a block diagram illustrating an overall configuration of the ATM switching device according to the aspect shown in FIG. 25.

FIG. 35 illustrates an overall configuration of the ATM switching device according to the aspect shown in FIG. 25.

Compared with the configuration shown in FIG. 33, significant differences lie in: the provision of a mask bit field extracting unit (MKA) A for extracting mask bit fields from a field designated by a mask bit field designating unit B and for transferring the content of the mask bit fields to the channel mask control unit 58; the provision of a mask bit field designating unit (MKB) B for producing a signal designating a mask bit field to be employed according to levels of input signals from terminals 1 to n, and for transmitting the produced signal to the mask bit field extracting unit A; and the provision of a signal line A1 over which the content of the mask bit fields extracted by the mask bit field extracting unit A are transmitted to the channel mask control unit 58.

An ATM switching processing executed by the ATM switching device shown in FIG. 35 is the same as that shown in the flowchart of FIG. 34, except that step ST1 is preceded by a step at which a mask bit field to be employed is designated according to logical levels of input signals from the terminals 1 to n.

Figure 36:
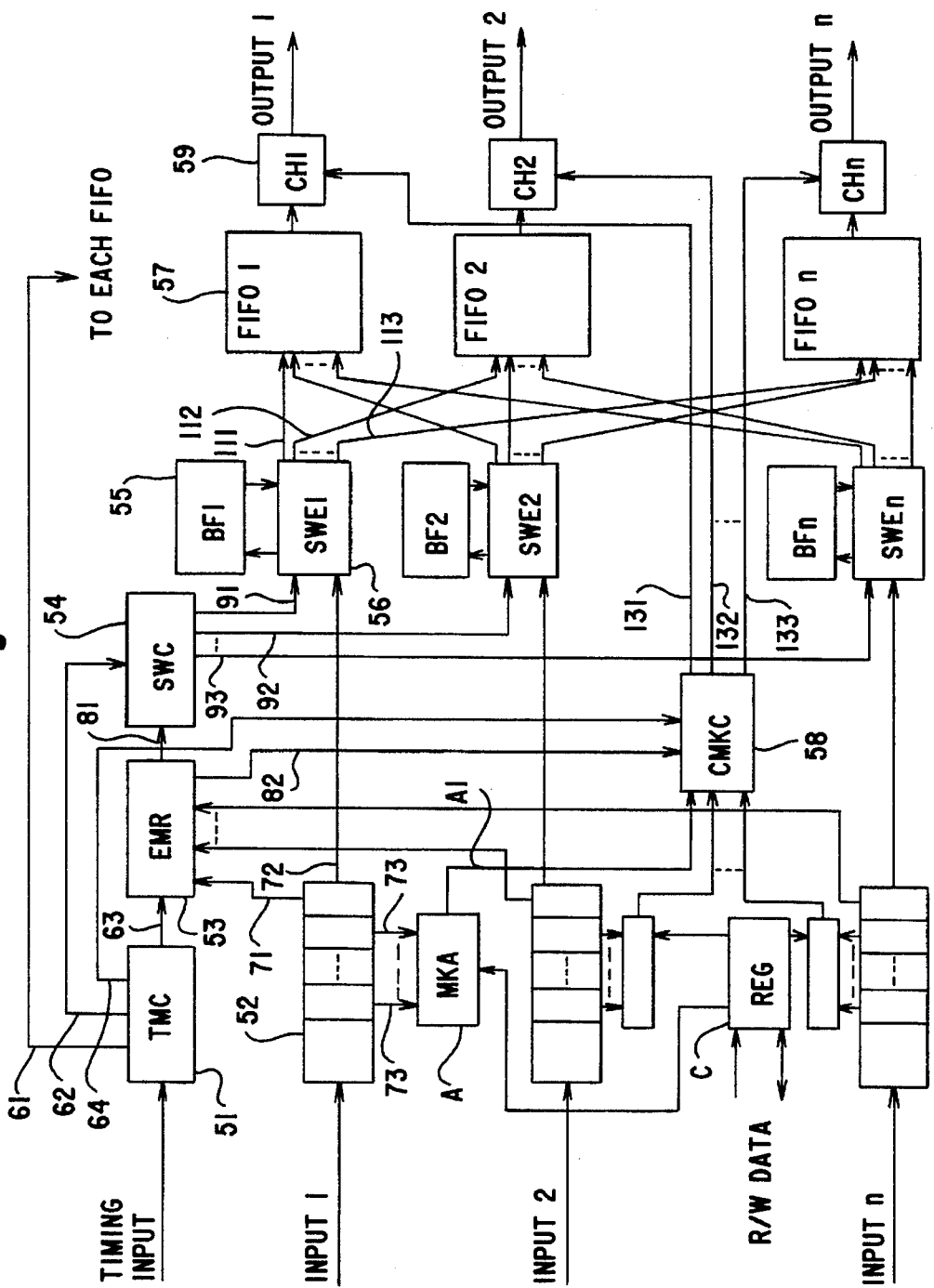
FIG. 36 is a block diagram illustrating an overall configuration of the ATM switching device according to the aspect shown in FIG. 26.

FIG. 36 illustrates an overall configuration of the ATM switching device according to the aspect shown in FIG. 26.

Compared with the configuration shown in FIG. 35, the difference lies in the provision of a control register (REG) C in place of the mask bit field designating unit (MKB) B.

An ATM switching processing executed by the ATM switching device shown in FIG. 36 is the same as that shown in the flowchart of FIG. 34, except that step ST1 is preceded by a step at which a mask bit field to be employed is designated according to a value or values stored in the control register C.

Next, an embodiment of the present invention to be implemented in the ATM switching device shown in FIG. 36 will be explained in detail with reference to FIGS. 37 to 39.

Figure 37:
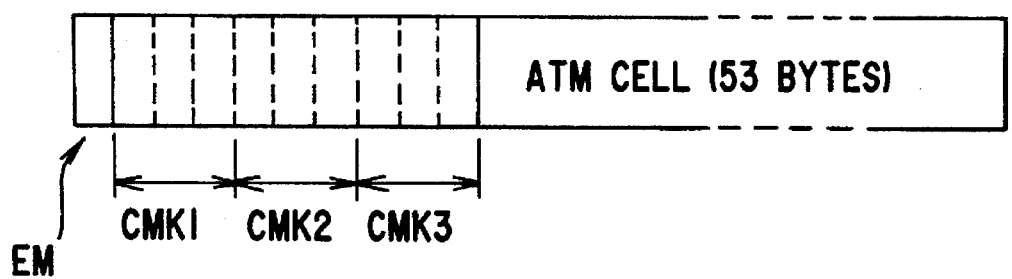
FIG. 37 is an explanatory diagram of an embodiment of the present invention to be implemented in the ATM switching device shown in FIG. 36.

FIG. 37 illustrates a format of an emergency identification bit and a channel mask bit field according to this embodiment; FIG. 38 illustrates the manner in which each switch element effects a switching operation using the format shown in FIG. 37; and FIG. 39 illustrates the manner in which an ATM cell is discarded in a switch element.

In FIG. 37, reference EM denotes an emergency identification bit which represents "1" so as to indicate an urgent ATM cell, and which represents "0" so as to indicate a normal ATM cell. Also, references CMK1 to CMK3 denote fields of channel mask bits, each of which represents "1" so as to signify "masking", and represents "0" so as to signify "passage".

Figure 38:
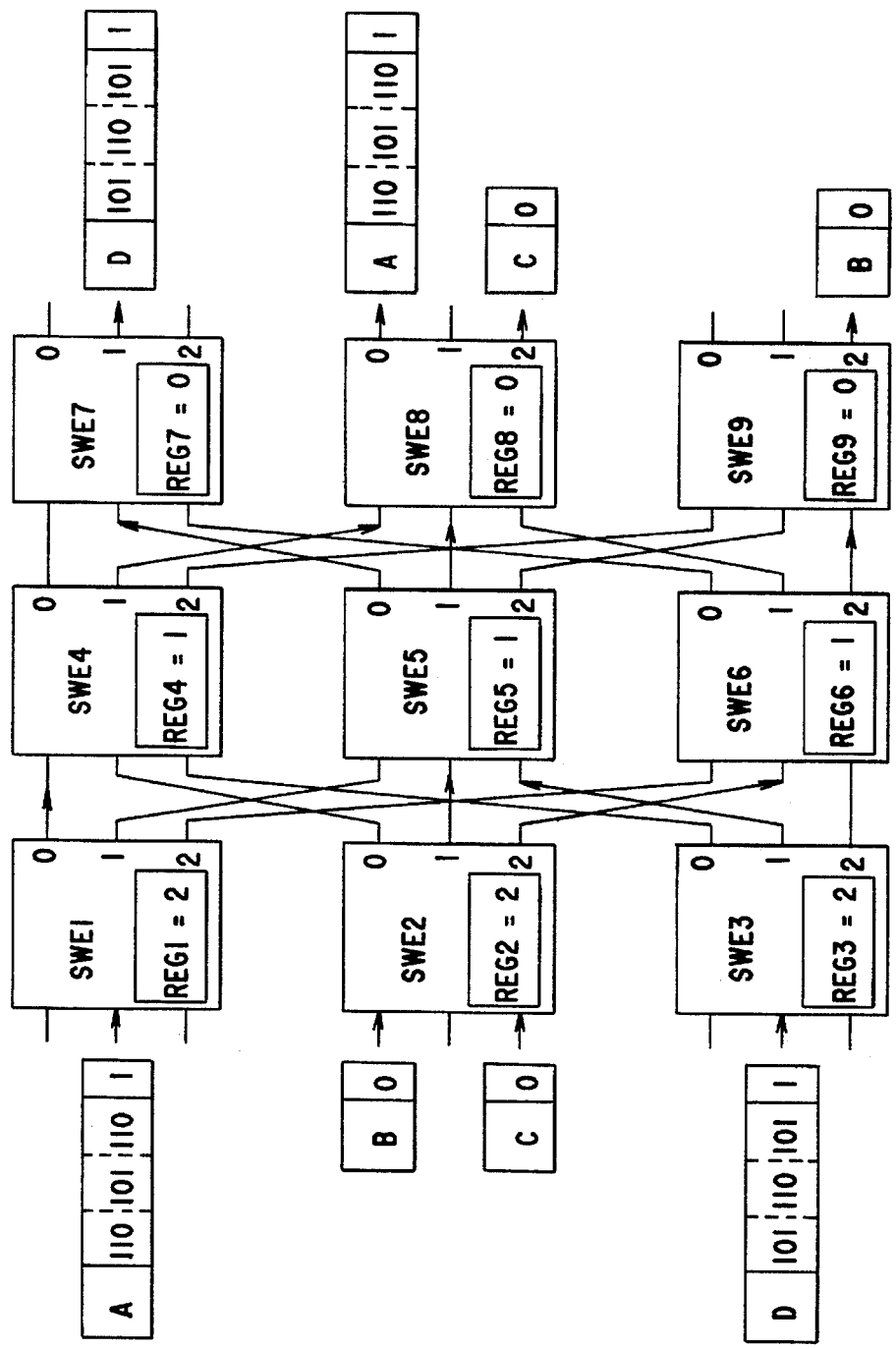
FIG. 38 is a supplementary explanatory diagram of FIG. 37.

FIG. 38 illustrates a group of switch elements composed of switch elements SWE1 to SWE9 each having three input terminals and three output terminals. In each switch element, a channel mask bit field to be employed is designated according to a value stored in the corresponding control register REG1 to REG9 incorporated in the respective switch elements SWE1 to SWE9. In this example, three left-hand switch elements SWE1 to SWE3 designate the third channel mask bit field; three central switch elements SWE4 to SWE6 designate the second channel mask bit field; and three right-hand switch elements SWE7 to SWE9 designate the first channel mask bit field.

Description of the ATM switching operation will proceed on the assumption that four ATM cells A to D simultaneously arrive at the switch elements SWE1 to SWE3. Each of these ATM cells is appended an emergency identification bit by a line handler (see FIGS. 22a and 22b) in line with the format shown in FIG. 37. Note, the ATM cells B and C have the emergency identification bit indicating "0", respectively, and thus they need not be padded with a channel mask bit field. The ATM cell A is an urgent ATM cell and is supposed to pass through the switch elements SWE1, SWE4, and SWE8 and exit through a channel 0. The ATM cell D is also an urgent ATM cell and thus is supposed to pass through the switch elements SWE3, SWE5, and SWE7 and exit through a channel 1. The ATM cell B is a normal ATM cell and is supposed to pass through the switch elements SWE2, SWE6, and SWE9 and exit through a channel 2. The ATM cell C is also a normal ATM cell. When the ATM cell C arrives at the switch element SWE5 after leaving the switch element SWE2, it is held in a memory buffer (not shown) incorporated in the switch element SWE5. This is for the reason described below.

Figure 39:
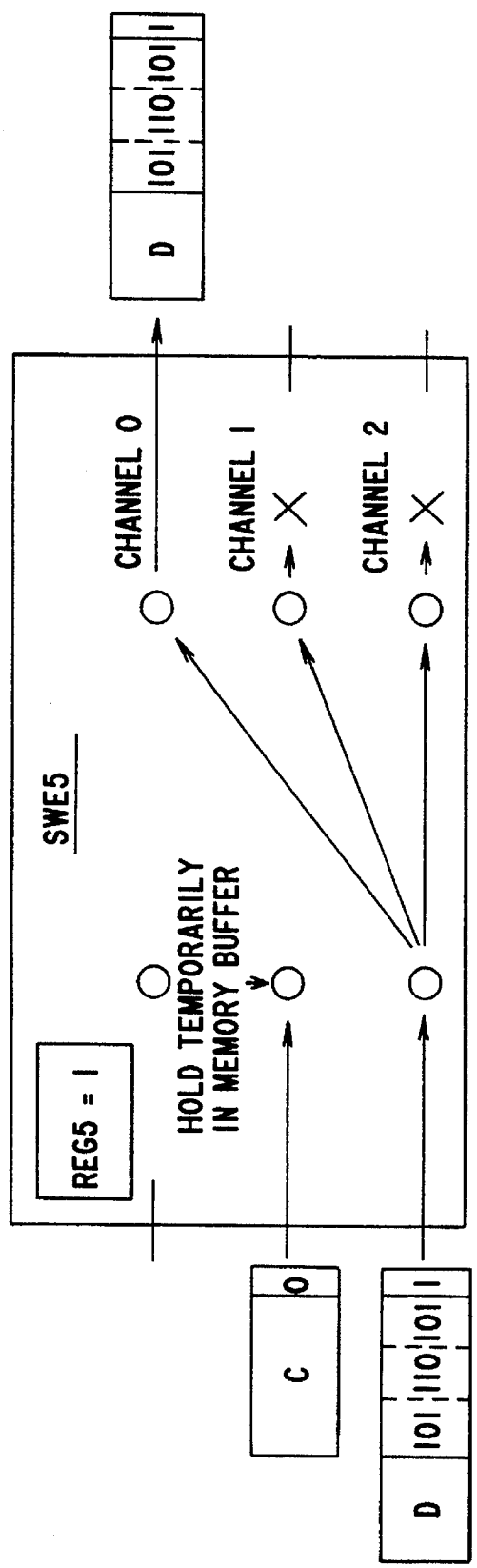
FIG. 39 is a supplementary explanatory diagram of FIG. 37.

Namely, as shown in FIG. 39, when the urgent ATM cell D and the normal ATM cell C arrive at the switch element SWE5 simultaneously, the ATM cell C is held in the built-in memory buffer and the urgent ATM cell D is caused to pass through the switch element SWE5. Thereafter, the ATM cell C is transmitted via the switch elements SWE5 and SWE8 to the channel 2.

As explained above, according to the present embodiment, it is possible to speedily effect a switching of an urgent ATM cell through ATM switch elements according to an emergency identification bit appended to the head of the ATM cell.

Figure 40:
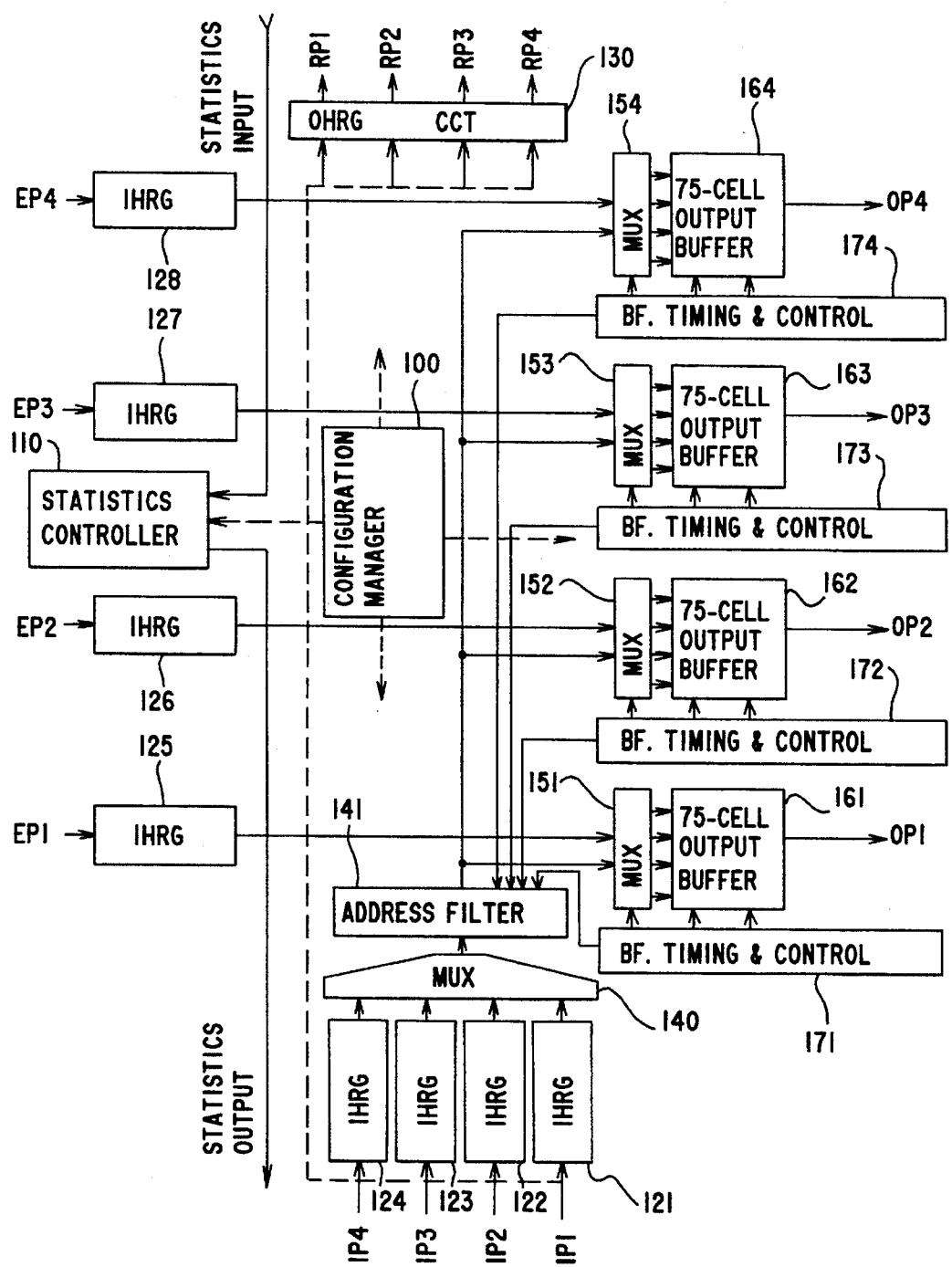
FIG. 40 is a block diagram illustrating another configuration of the ATM switching device according to the aspect shown in FIGS. 2a and 2b.

FIG. 40 illustrates another configuration of the ATM switching device according to the aspect shown in FIGS. 2a and 2b.

The illustrated configuration shows a block diagram of MB86680 which is a self-routing switching element (SRE). The MB86680 (SRE) is designed for use in ATM switching structures and is ideal for a variety of applications, including ATM hubs and ATM switching equipment. The MB86680 (SRE) is provided with a 4-input×4-output switching configuration and independent input and output ports, and thus is designed to allow easy expansion of switching matrix formats. In operation, the MB86686 (ALC) and MB86689 (ATC) generate routing tags in accordance with Virtual Path Identifier/Virtual Channel Identifier (VPI/VCI) standards established by the International Telecommunication Union-Telecommunication Standardization Sector (ITU-TS) Recommendations 1.361 and 1.311. Routing tags that determine circuit lines are supplied to the MB86680 (SRE). The MB86680 (SRE) then refers to the routing tags so as to perform self-routing switching functions. The routing tags can be removed by the MB86683 (NTC) or MB86686 (ALC).

Referring to FIG. 40, the MB86680 (SRE) includes a configuration manager 100, a statistics controller 110, input holding registers (IHRGs) 121 to 128, an output holding register (OHRG) circuit 130, a multiplexer (MUX) 140, an address filter 141, multiplexers 151 to 154, 75-cell output buffers 161 to 164, and buffer timing and control circuits 171 to 174.

The input holding registers 121 to 124 (or 125 to 128) temporarily store 8-bit input data (ATM cells) when the data enters through input ports IP1 to IP4 (or expansion ports EP1 to EP4). The output holding register circuit 130 temporarily stores 8-bit data (ATM cells) before the data are output from regeneration ports RP1 to RP4. The address filter 141 compares addresses allocated to each output port OP1 to OP4 with address information in the routing tags added to each ATM cell, and determines address field size and location settings for addresses allocated to each output port OP1 to OP4 and within each routing tag.

Each of the 75-cell output buffers 161 to 164 is allocated to the corresponding output port OP1 to OP4, and has a capacity of 75 ATM cells at the maximum. Each buffer can be decomposed into 25 high-priority ATM cells and 50 normal-priority ATM cells. The buffer timing and control circuits 171 to 174 control outputting of ATM cells to each output port OP1 to OP4. Also, each buffer timing and control circuit 171 to 174 uses information in the routing tags attached to each ATM cell so as to determine the priority of the ATM cell, as well as discard of ATM cells in case of buffer overflow. The buffer timing and control circuits 171 to 174 also control the operation of the address filter 141. Also, each buffer timing and control circuit 171 to 174 controls the multicast operation to enable the ATM cell output to multiple output ports in a single pass.

The statistics controller 110 accumulates control information about 75-cell output buffer overflows and ATM cell discard, for external use. The information can be output in serial data form from the MB86680 (SRE) STATSOUT terminal. Note that it is possible to accumulate statistical data for a matrix configuration by connecting the STATSOUT terminal to the STATSIN terminal of another MB86680 (SRE) in a daisy chain connection.

The MB86680 (SRE) is a 4-input×4-output switch providing switching operations for a 155.52 M-bit/s interface. As described above, the MB86680 (SRE) is provided with four input ports IP1 to IP4, four expansion ports EP1 to EP4, four output ports OP1 to OP4 and four regeneration ports RP1 to RP4, and thus the constitution allows multiple MB86680 (SRE) chips to be connected in matrix form for expanded switching configurations.

Each input port IP1 to IP4 accepts input of ATM cells. Each expansion port EP1 to EP4 accepts input of ATM cells that have been output from a preceding MB86680 (SRE) chip connected in the same column in the matrix configuration. Each output port OP1 to OP4 is capable of accepting parallel data input of a total of five ports, i.e., data input from the four input ports plus one expansion port, into its buffer with a total capacity of 75 cells. In this case, the ATM cell data received through the five ports are output from a single output port. All of the ATM cells entering through each input port are switched according to information contained in a 3-byte routing tag (stated later). Each regeneration port RP1 to RP4 sends ATM cells to a following MB86680 (SRE) chip connected in the matrix configuration.

In addition, the MB86680 (SRE) compiles statistical data on ATM cells discarded through buffer overload.

Figure 41:
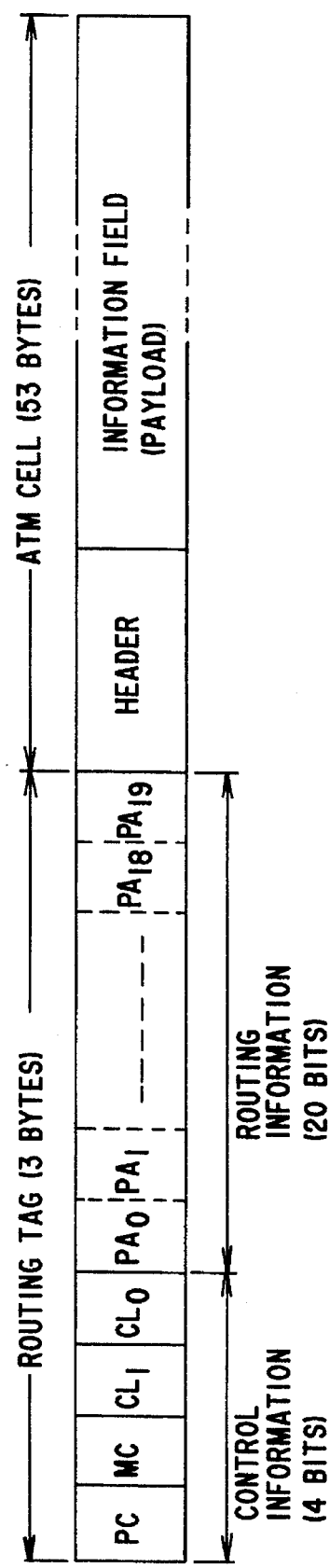
FIG. 41 is a diagram illustrating a format of the routing tag used in the ATM switching device shown in FIG. 40.

FIG. 41 illustrates a format of the routing tag used in the ATM switching device (SRE: MB86680) shown in FIG. 40.

As illustrated, the routing tag is composed of 3 bytes and is appended to the head of the ATM cell of 53 bytes. The routing tag contains a control information and a routing information used for switching the ATM cell. The control information is composed of 4 bits, i.e., "PC" for setting a priority level of the ATM cell; "MC" for setting a multicast operation; and "$CL_0$ and $CL_1$" for setting a buffer threshold value for use in discarding of ATM cells. Namely, the control information is used to determine the priority level of the ATM cell, as well as which ATM cells are discarded as a result of buffer filling levels. On the other hand, the routing information is composed of 20 bits, i.e., "$PA_0$ to $PA_1$," indicating addresses corresponding to the output ports of the MB86680 (SRE) chip. Namely, the routing information is used to determine the address of an output port to which the ATM cell is routed.

Figure 42:
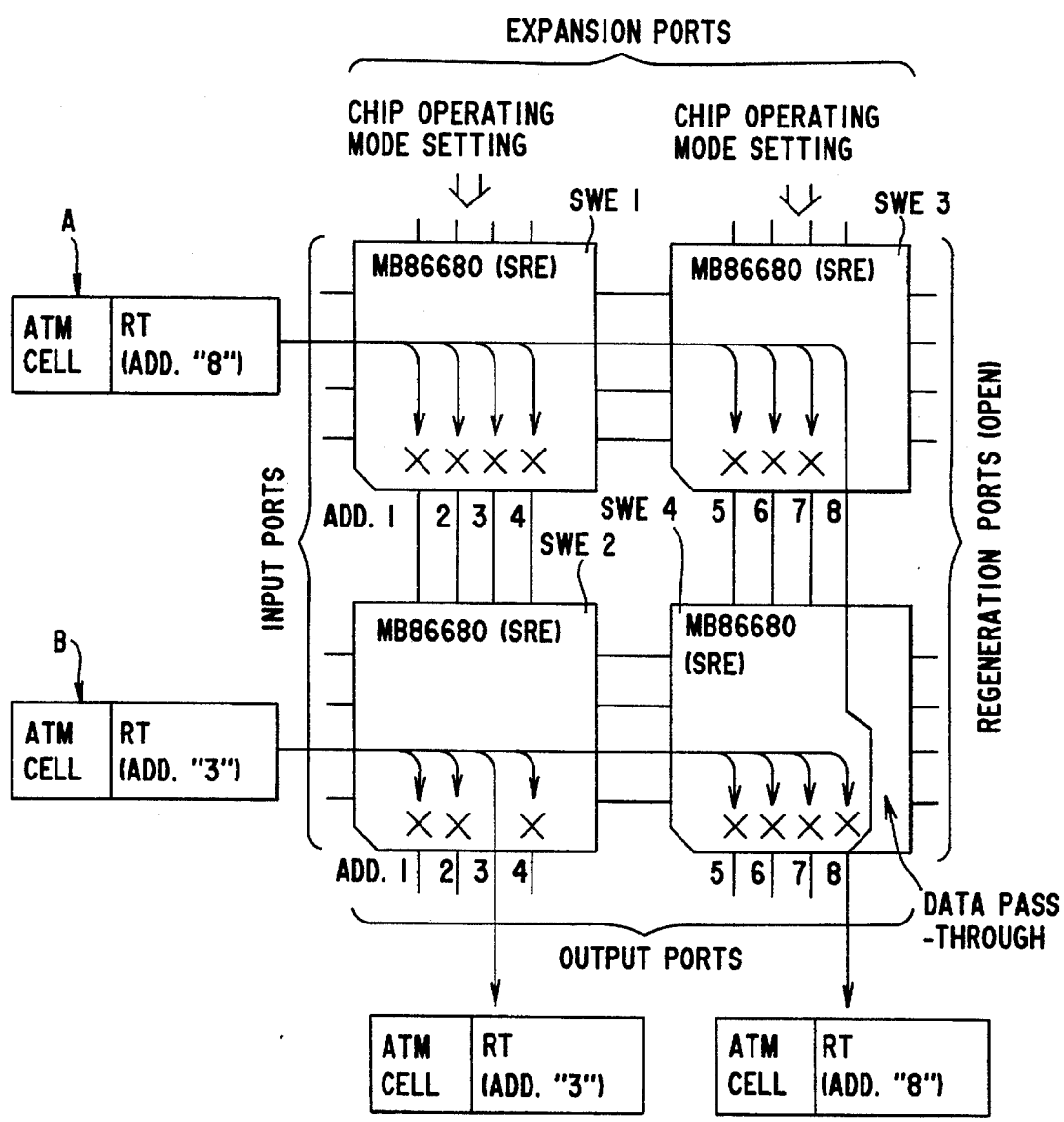
FIG. 42 is an explanatory diagram of an example of the switching operation using the ATM switching device shown in FIG. 40.

FIG. 42 illustrates an example of the switching operation using the ATM switching device (SRE: MB86680) shown in FIG. 40.

The illustrated example shows an 8-input×8-output switching operation using four MB86680 (SRE) chips. When an ATM cell enters the MB86680 (SRE), it is simultaneously compared with all of the output port addresses. Each output port outputs only ATM cells with matching addresses. After comparison, the data in ATM cells are passed through the next MB86680 (SRE) for output.

Referring to FIG. 42, an ATM cell A is input to a first switching element SWE1 (MB86680 (SRE)), and then sent to a third switching element SWE3 (MB86680 (SRE)) for address comparison. In this case, the address is "8", and thus the ATM cell is sent to the output port which has an address of "8". At this time, a fourth switching element SWE4 (MB86680 (SRE)) allows the ATM cell A to pass through directly without carrying out address comparison. As for an ATM cell B, it has an address of "3", and thus is sent to the output port with an address of "3" of a second switching element SWE2 (MB86680 (SRE)).

Although the present invention has been disclosed and described by way of several embodiments and modifications, it is apparent to those skilled in the art that other embodiments and modifications of the present invention are possible without departing from the essential features thereof.

What is claimed is:

1. An ATM switching device comprising:

at least one ATM switch element; and means for appending a routing tag, which is composed of a single byte or a plurality of bytes and related to an incoming ATM cell, to the head of said ATM cell, said routing tag including a control information having information concerning a priority level of said ATM cell and a discard level thereof, and including a routing information defining a signal address or a plurality of addresses, said ATM switch element effecting a priority control for said ATM cell, and a discard control of an ATM cell or ATM cells depending on a storage quantity of a congestion control memory buffer, according to said control information, and effecting a switching of said ATM cell according to an address value or address values defined in said routing information;

further comprising means for padding said routing tag with a trailing field of channel mask bits in order of exit channels in the ATM switch element, wherein when an ATM cell whose routing tag represents a given logical value arrives at said ATM switch element, the ATM switch element does not effect a switching of the ATM cell according to header information of the ATM cell, but sends said ATM cell to all exit channels in said ATM switch element so as to handle said all exit channels as transmission destinations, masks exit channels, of which associated channel mask bits represent given logical values, in said ATM switch element so as to block out said ATM cell but pass said ATM cell through the other exit channels, of which channel mask bits do not represent said given logical values, in said ATM switch element.

2. The ATM switching device according to claim 1, wherein said routing tag is appended to the head of said ATM cell, with units of bits.

3. The ATM switching device according to claim 1, wherein, where the priority level of an ATM cell can be expressed by two kinds of a high level and a low level, said ATM switching device further comprises means for padding one bit at the head of the control information in said routing tag with a priority setting bit, and wherein said ATM switch element effects a priority control for the ATM cell according to a logical value of said padded bit.

4. The ATM switching device according to claim 1, wherein, where the priority level of an ATM cell can be expressed by three kinds of a high level, a low level, and an intermediate level, or by more kinds, said ATM switching device further comprises means for padding a plurality of bits, which can represent said priority level, starting with the head bit of said routing tag with a priority setting bit field, and wherein said ATM switch element effects a priority control for the ATM cell according to values of said padded plurality of bits.

5. The ATM switching device according to claim 4, further comprising at least one terminal provided for each ATM switch element and for use in designating a bit length of the priority setting bit field in said routing tag.

6. The ATM switching device according to claim 4, further comprising a control register provided for each ATM switch element and for use in designating a bit length of the priority setting bit field in said routing tag.

7. The ATM switching device according to claim 1, further comprising means for padding a priority setting bit field in the routing tag with one trailing discard level setting bit that signifies a discard level of the ATM cell, wherein when new ATM cells arrive at an ATM switch element with a congestion control memory buffer in said ATM switch element being full, the same number of ATM cells, whose discard level setting bits represent given logical values, as that of said new ATM cells are selected from among those residing in said memory buffer and those newly arrived, and then the selected ATM cells are discarded.

8. The ATM switching device according to claim 7, wherein when new ATM cells arrive at an ATM switch element with said congestion control memory buffer in said ATM switch element being full, even if an ATM cell, which can be discarded because its discard level setting bit represents a given logical value, resides in said memory buffer or is included in the ATM cells newly arrived, if said ATM cell has a higher priority level than others residing in said memory buffer, said ATM cell is not discarded, but any of said ATM cells residing in said memory buffer or newly arrived, of which priority levels are the lowest and of which discard level bits are set to a given logical level, are discarded.

9. The ATM switching device according to claim 1, further comprising means for padding a priority setting bit field in the routing tag with a trailing field of a plurality of bits long signifying a discard level of the ATM cell, wherein it is programmed that an ATM cell be discarded when a filling factor of a congestion control memory buffer based on a combination of said plurality of bits is attained, and wherein when the filling factor of said congestion control memory buffer satisfies a condition provided by said field signifying a discard level, the ATM cell is discarded.

10. The ATM switching device according to claim 9, wherein when a condition provided by said field signifying a discard level is satisfied by the filling factor of said congestion control memory buffer, one of ATM cells residing in the memory buffer, which indicates the condition satisfied by the filling factor of said memory buffer and has the lowest priority level, is discarded.

11. The ATM switching device according to claim 8, wherein when a condition defined by logical values in said field signifying a discard level is satisfied, if a plurality of ATM cells have the lowest priority levels and outnumber cells that should be discarded, ATM cells residing in said memory buffer or newly arrived are discarded sequentially in such an order that an ATM cell to be transmitted last is discarded first.

12. The ATM switching device according to claim 10, wherein when a condition defined by logical values in said field signifying a discard level is satisfied, if a plurality of ATM cells have the lowest priority levels and outnumber cells that should be discarded, ATM cells residing in said memory buffer or newly arrived are discarded sequentially in such an order that an ATM cell to be transmitted last is discarded first.

13. The ATM switching device according to claim 8, wherein when a condition defined by logical values in said field signifying a discard level is satisfied, if a plurality of ATM cells have the lowest priority levels and outnumber cells that should be discarded, ATM cells residing in said memory buffer or newly arrived are discarded sequentially in such an order that an ATM cell to be transmitted first is discarded first.

14. The ATM switching device according to claim 10, wherein when a condition defined by logical values in said field signifying a discard level is satisfied, if a plurality of ATM cells have the lowest priority levels and outnumber cells that should be discarded, ATM cells residing in said memory buffer or newly arrived are discarded sequentially in such an order that an ATM cell to be transmitted first is discarded first.

15. The ATM switching device according to claim 8, wherein when a condition defined by logical values in said field signifying a discard level is satisfied, if cells that should be discarded outnumber ATM cells having the lowest priority levels, any of ATM cells residing in said memory buffer or newly arrived, whose priority level is the second lowest and whose field signifying a discard level contains logical values defining a condition satisfied by said memory buffer, is discarded.

16. The ATM switching device according to claim 10, wherein when a condition defined by logical values in said field signifying a discard level is satisfied, if cells that should be discarded outnumber ATM cells having the lowest priority levels, any of ATM cells residing in said memory buffer or newly arrived, whose priority level is the second lowest and whose field signifying a discard level contains logical values defining a condition satisfied by said memory buffer, is discarded.

17. The ATM switching device according to claim 8, wherein when said memory buffer is full, if cells that should be discarded outnumber ATM cells having the lowest priority levels, ATM cells newly arrived are discarded unconditionally.

18. The ATM switching device according to claim 10, wherein when said memory buffer is full, if cells that should be discarded outnumber ATM cells having the lowest priority levels, ATM cells newly arrived are discarded unconditionally.

19. The ATM switching device according to claim 7, further comprising at least one terminal provided for each ATM switch element and for use in designating at what bit position relative to the head bit of said routing tag the head bit of said field signifying a discard level in the routing tag is located.

20. The ATM switching device according to claim 9, further comprising at least one terminal provided for each ATM switch element and for use in designating at what bit position relative to the head bit of said routing tag the head bit of said field signifying a discard level in the routing tag is located.

21. The ATM switching device according to claim 7, further comprising a control register provided for each ATM switch element and for use in designating at what bit position relative to the head bit of said routing tag the head bit of said field signifying a discard level in the routing tag is located.

22. The ATM switching device according to claim 9, further comprising a control register provided for each ATM switch element and for use in designating at what bit position relative to the head bit of said routing tag the head bit of said field signifying a discard level in the routing tag is located.

23. The ATM switching device according to claim 7, further comprising means for padding said field signifying a discard level in said routing tag with a trailing field of a given number of bits or bytes long signifying a size of the routing information in the routing tag.

24. The ATM switching device according to claim 9, further comprising means for padding said field signifying a discard level in said routing tag with a trailing field of a given number of bits or bytes long signifying a size of the routing information in the routing tag.

25. The ATM switching device according to claim 1, wherein said single address value in the routing information in said routing tag corresponds to a final exit channel value in said ATM switch element, whereby switching of the ATM cell is effected according to the single address.

26. The ATM switching device according to claim 1, wherein said plurality of address values in the routing information in said routing tag correspond to final exit channel values in each ATM switch element, and wherein when addresses are set by the number of ATM switch elements through which an ATM cell passes, said addresses required by respective ATM switch elements for switching an ATM cell are retrieved sequentially by said respective ATM switch elements so that said ATM cell can be switched.

27. The ATM switching device according to claim 26, further comprising at least one terminal provided for each ATM switch element and for use in designating at what bit position of the routing information in said routing tag an address required for switching an ATM cell is located.

28. The ATM switching device according to claim 26, further comprising a control register provided for each ATM switch element and for use in designating at what bit position of the routing information in said routing tag an address required for switching an ATM cell is located.

29. The ATM switching device according to claim 1, wherein said ATM switch element is constituted in the form of one chip.

30. An ATM switching device comprising:

at least one ATM switch element; and means for appending an emergency identification bit indicating whether or not an incoming ATM cell is an urgent ATM cell, to the head of said ATM cell, when an ATM cell whose emergency identification bit represents a given logical value arrives at said ATM switch element, the ATM switch element holding all of ATM cells, other than ATM cells whose emergency identification bits represent said given logical values and which reside in the ATM switch element, in a congestion control memory buffer, so as to effect a switching of the urgent ATM cell as a top priority;

further comprising means for padding said emergency identification bit with a trailing field of channel mask bits in order of exit channels in the ATM switch element, wherein when an ATM cell whose emergency identification bit represents a given logical value arrives at said ATM switch element, the ATM switch element does not effect a switching of the ATM cell according to header information of the ATM cell, but sends said ATM cell to all exit channels in said ATM switch element so as to handle, said all exit channels as transmission destinations, masks exit channels, of which associated channel mask bits represent given logical values, in said ATM switch element so as to block out said ATM cell but pass said ATM cell through the other exit channels, of which channel mask bits do not represent said given logical values, in said ATM switch element.

31. The ATM switching device according to claim 30, further comprising means for padding said emergency identification bit with trailing fields of channel mask bits numbering the same as exit channels in ATM switch elements through which an ATM cell passes, wherein the channels in said ATM switch elements are masked sequentially according to the logical values of associated channel mask bits in such order that a channel in an ATM switch element through which an urgent ATM cell passes first is masked first.

32. The ATM switching device according to claim 31, further comprising at least one terminal provided for each ATM switch element and for use in designating a field of channel mask bits that is associated with a respective ATM switch element.

33. The ATM switching device according to claim 31, further comprising a control register provided for each ATM switch element and for use in designating a field of channel mask bits that is associated with a respective ATM switch element.

34. The ATM switching device according to claim 30, wherein said ATM switch element is constituted in the form of one chip.

* * * * *